US007650403B2

United States Patent
Koetke et al.

(10) Patent No.: US 7,650,403 B2
(45) Date of Patent: Jan. 19, 2010

(54) SYSTEM AND METHOD FOR CLIENT SIDE MONITORING OF CLIENT SERVER COMMUNICATIONS

(75) Inventors: Dale Koetke, Redmond, WA (US); Xiaowen Shan, Kirkland, WA (US); Nicole A. Bonilla, Redmond, WA (US); Alec Dun, Redmond, WA (US); Michael C. Price, San Diego, CA (US); A. Perry Clarke, Bellevue, WA (US); Marc R. Allen, Seattle, WA (US); Joseph K. W. Chan, Redmond, WA (US); Ronald E. Gray, Redmond, WA (US); Aaron Hartwell, Duvall, WA (US); Steven F. Goddard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 10/634,937

(22) Filed: Aug. 5, 2003

(65) Prior Publication Data

US 2004/0098478 A1    May 20, 2004

Related U.S. Application Data

(60) Provisional application No. 60/428,214, filed on Nov. 20, 2002.

(51) Int. Cl.
    *G06F 15/173*    (2006.01)
(52) U.S. Cl. .................... 709/224; 709/235; 370/232
(58) Field of Classification Search ................ 709/224, 709/235, 241, 242, 206
See application file for complete search history.

(56) References Cited

U.S. PATENT DOCUMENTS 5,627,766 A * 5/1997 Beaven ..................... 702/122

(Continued)

FOREIGN PATENT DOCUMENTS

CA      2329891 A1    6/2002

(Continued)

OTHER PUBLICATIONS

Lawrence, Sherwood. Network Diagnostics Tools Feature Overview. Nov 1, 2001. Microsoft TechNet. <http://www.microsoft.com/technet/prodtechnol/winxppro/maintain/netdiag.mspx>.*

(Continued)

*Primary Examiner*—Patrice Winder
*Assistant Examiner*—Jeffrey R Swearingen
(74) *Attorney, Agent, or Firm*—Merchant & Gould P.C.

(57) ABSTRACT

The performance of client server interactions is measured by the interacting client. The client-generated performance data is efficiently transmitted to one or more servers by incorporating the performance data regarding one or more previous request/response cycles into a subsequent request. Performance data transmission is made more efficient by transmitting performance data context such as client, server and session details once per connection. Performance data is stored on the client until transmitted or until it has aged beyond a server specified maximum age. Performance data is aggregated on the server in memory resident accumulators. The server may have a set of accumulators for each server its clients communicate with as well as a set for each client. An accumulator value crossing a configurable threshold may trigger an event log entry. The number of performance data events in an event class may be limited to a maximum for a time period.

27 Claims, 11 Drawing Sheets

U.S. PATENT DOCUMENTS

| | | | |
|---|---|---|---|
| 5,664,106 A * | 9/1997 | Caccavale | 709/224 |
| 5,696,701 A * | 12/1997 | Burgess et al. | 714/25 |
| 5,732,218 A * | 3/1998 | Bland et al. | 709/224 |
| 5,781,703 A * | 7/1998 | Desai et al. | 709/224 |
| 5,870,556 A * | 2/1999 | Cote et al. | 709/224 |
| 5,938,729 A * | 8/1999 | Cote et al. | 709/224 |
| 5,958,009 A * | 9/1999 | Friedrich et al. | 709/224 |
| 6,012,096 A * | 1/2000 | Link et al. | 709/233 |
| 6,377,978 B1 | 4/2002 | Nguyen | |
| 6,385,672 B1 * | 5/2002 | Wang et al. | 710/56 |
| 6,477,586 B1 * | 11/2002 | Achenson et al. | 719/330 |
| 6,598,078 B1 * | 7/2003 | Ehrlich et al. | 709/224 |
| 6,874,099 B1 * | 3/2005 | Balasubramanian et al. | 714/4 |
| 7,016,909 B2 * | 3/2006 | Chan et al. | 707/101 |
| 7,082,463 B1 * | 7/2006 | Bradley et al. | 709/223 |
| 7,100,171 B1 * | 8/2006 | Kaluskar et al. | 719/330 |
| 7,389,360 B1 * | 6/2008 | Patel et al. | 709/238 |
| 7,454,457 B1 * | 11/2008 | Lowery et al. | 709/203 |
| 2002/0093923 A1 | 7/2002 | Bouet | |
| 2002/0095487 A1 * | 7/2002 | Day et al. | 709/223 |
| 2003/0158942 A1 * | 8/2003 | Frank et al. | 709/226 |
| 2004/0064552 A1 * | 4/2004 | Chong et al. | 709/224 |

FOREIGN PATENT DOCUMENTS

| | | |
|---|---|---|
| EP | 1631025 A2 | 1/2006 |
| WO | 94/13086 A1 | 6/1994 |
| WO | 00/57612 A2 | 9/2000 |
| WO | 02/21749 A2 | 3/2002 |

OTHER PUBLICATIONS

Internet Header Format. Connected: An Internet Encyclopedia. May 8, 1999. <http://www.freesoft.org/CIE/RFC/791/12.htm>.*

TCP Header Format. Connected: An Internet Encyclopedia. Jan 18, 1998. <http://www.freesoft.org/CIE/Course/Section4/8.htm>.*

Douglas Low. Protecting Java Code Via Code Obfuscation. May 18, 2000. <http://www.cs.arizona.edu/~collberg/Research/Students/DouglasLow/obfuscation.html>.*

Birrell, et al., Implementing Remote Procedure Calls, ACM Transactions on Computer Systems, vol. 2, No. 1, 21 pp., Feb. 1984.

Srinivasan, R., RPC: Remote Procedure Call Protocol Specification Version 2, 19 pp., Aug. 1995, Sun Microsystems, Mountain View, California.

Satyanarayanan, et al., The RPC2 Runtime System (Manual), May 2000, pp. 37-62, URL:http://www.coda.cs.cmu.edu/doc/ps/rpc2_manual.ps.gz., XP-002282906.

* cited by examiner

SYSTEM AND METHOD FOR CLIENT SIDE MONITORING OF CLIENT SERVER COMMUNICATIONS

REFERENCE TO RELATED APPLICATION

This application claims the benefit of U.S. application No. 60/428,214, filed Nov. 20, 2002, entitled "SYSTEM AND METHOD FOR CLIENT SIDE MONITORING OF CLIENT SERVER COMMUNICATIONS," and incorporated herein by reference.

FIELD OF THE INVENTION

This invention generally relates to computer networks, and more particularly, to methods for communicating between client and server applications such as e-mail applications.

BACKGROUND OF THE INVENTION

Electronic mail (e-mail) has become an important method for communicating. E-mail systems typically include a server component (e.g., Microsoft® Exchange Server) and a client component (e.g., Microsoft® Outlook® or Microsoft® Outlook® Express). These components are typically software applications that are configured to execute on computing devices (e.g., servers, PCs, laptops, and PDAs).

Often, in order to facilitate communications, a client and server, such as the client component and the server component of an email system, agree on a communications protocol. The protocol sets out rules defining expected behavior of each party during communications, for example, the expected sequence of request and response. Remote procedure calls (RPCs) are an example of a communications protocol. By utilizing remote procedure calls a program on one computer may execute a program on a server computer. A system developer may not need to develop specific procedures for the server: the client program sends a message to the server with appropriate arguments and the server returns a message containing the results of the program executed.

Some types of e-mail servers are configured to allow e-mail to be accessed via an Internet browser client (e.g., Microsoft® Internet Explorer) rather than a dedicated e-mail client. One such system is Microsoft® Exchange Server's Outlook® Web Access feature. In these systems, the browser interacts with the e-mail server, and any functions required to be performed on the client system are performed through the browser (e.g., by downloading Javascript) or through the use of Active Server Pages or the like.

Since client and servers are often connected by networks that have low bandwidth and high latency (e.g., slow dial-up connections), many users experience undesirable delays when accessing information from the server utilizing the client server protocol. However, some of these delays may be reducible if the cause of the delay can be accurately determined. For example, if a particular unreliable or overtaxed network connection is causing packets to be dropped, a network administrator may be able to reconfigure the network to reduce congestion.

While monitoring end-to-end messaging service quality is something network administrators would like to do, they typically do not have the ability to accurately measure quality from the client's perspective. Current tools that purport to offer such functionality typically require that a separate monitoring application be deployed and maintained on each client machine to be monitored. Requiring a separate monitoring application has disadvantages. For example, a separate monitoring application typically utilizes the same resources as the monitored application. In a resource-strained client server environment, the separate monitoring application may itself contribute to degradation of service quality. In addition, some conventional separate monitoring applications monitor environment parameters only indirectly related to service quality as perceived by a user of the client, for example, monitoring an underlying protocol transport layer such as TCP/IP rather than the client server protocol itself. As a result, conventional separate monitoring applications may give network administrators the impression that performance is acceptable during periods when client users are experiencing problems.

SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An embodiment provides a system and method for client side monitoring of client server communications. More particularly, the embodiment is directed to measuring and communicating the performance of client server communications from a client perspective. The embodiment has particular relevance to communications between e-mail clients and e-mail servers, but the features described herein may be utilized in other client server networks.

In accordance with an embodiment, a client sends a first request to a server. The server sends a first response to the client. The client measures the latency from the client's dispatch of the first request to the client's receipt of the first response from the server. The client appends the measured latency to a second request to the server.

In accordance with an embodiment, a client monitors the status of remote procedure calls (RPCs) sent to a server. The status information is sent to the server by appending it to at least one subsequent RPC. The server generates aggregate statistics regarding the RPC performance of the server as perceived by the client. The server generates an alert if the aggregate statistics indicate problematic RPC performance by exceeding a threshold.

In accordance with an embodiment, a client sends a request to a server. The client records the request initiation time. The client receives a response. The client records the response received time. Round trip latency for the request/response pair as perceived by the client is calculated as response received time less request initiation time. Performance data regarding the request/response pair, including round trip latency, is incorporated into another request to the server. The performance data may also be incorporated into a request to another server.

In accordance with an embodiment, a client sends a request to a server. The request fails, resulting in an error condition. The client records the error condition as perceived by the client. Performance data regarding the failed request, including the error condition as perceived by the client, is incorporated into another request to the server. As is typical, the request incorporating the performance data also includes an indication of one or more services desired of the server by the client.

In accordance with an embodiment, performance data may be stored at a client and the time at which it is stored may be recorded. If the initiation time of a request suitable for incorporating the performance data less the performance data storage time, is greater than a maximum performance data age threshold then the performance data is not incorporated into the request.

In accordance with an embodiment, a client includes a performance data store, a performance data measurement module, a server performance data preference store, a performance data stream parse module, and a performance data stream format module. The performance data measurement module generates performance data and stores it in the performance data store. The performance data stream parse module parses an incoming data stream for server performance data preferences and stores them in the server performance data preference store. The performance data stream format module formats and inserts performance data from the performance data store into an outgoing data stream in accordance with server performance data preferences.

In accordance with an embodiment, a server includes a performance data stream parse module, at least one server system memory resident performance data accumulator, and a performance data report module. The performance data stream parse module parses client-generated performance data from an incoming data stream. The performance data report module updates the accumulator(s) from the parsed performance data.

In accordance with an embodiment, a performance data format includes a performance data remote procedure call (RPC) extension tag, and at least one performance data block. The performance data RPC extension tag includes a performance data format version field, at least one performance data format flag, a performance data size field, and an uncompressed performance data size field. Each performance data block includes a performance data block header, and a performance data block body. The performance data block header includes a performance data block size field, a performance data block format version field, and a performance data block type field.

Additional features of the invention will be set forth in the description that follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter. The headings included below in the detailed description are for organizational purposes only and are not intended to limit or modify the scope of the invention or the appended claims.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
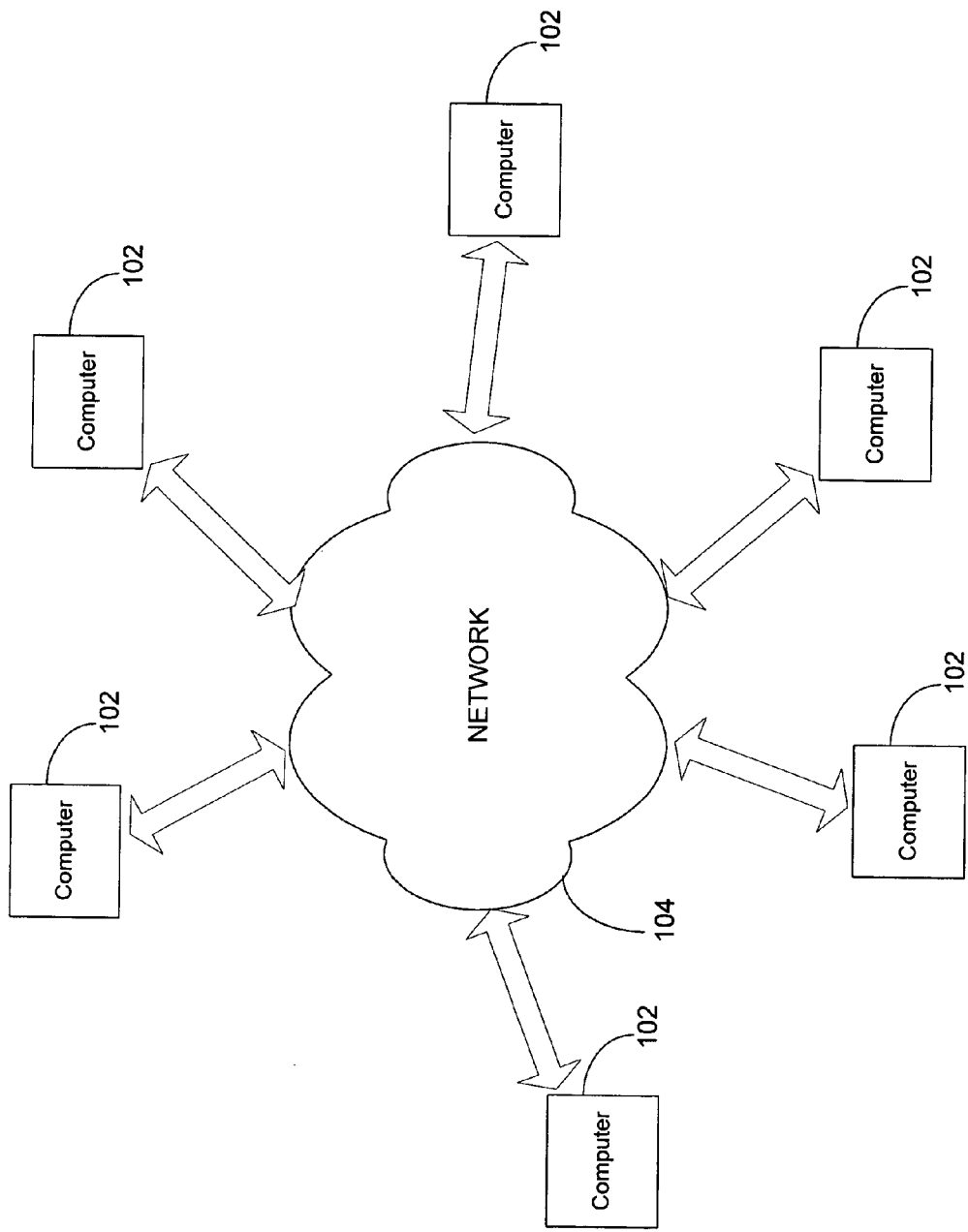
FIG. 1 is a schematic diagram illustrating computers connected by a network.

An example of a networked environment in which the invention may be used will now be described with reference to FIG. 1. The example network includes several computers 102 communicating with one another over a network 104, represented by a cloud. Network 104 may include many well-known components, such as routers, gateways, hubs, etc. and allows the computers 102 to communicate via wired and/or wireless media. When interacting with one another over the network 104, one or more of the computers may act as clients, servers or peers with respect to other computers. Accordingly, the various embodiments of the invention may be practiced on clients, servers, peers or combinations thereof, even though specific examples contained herein do not refer to all of these types of computers.

Figure 2:
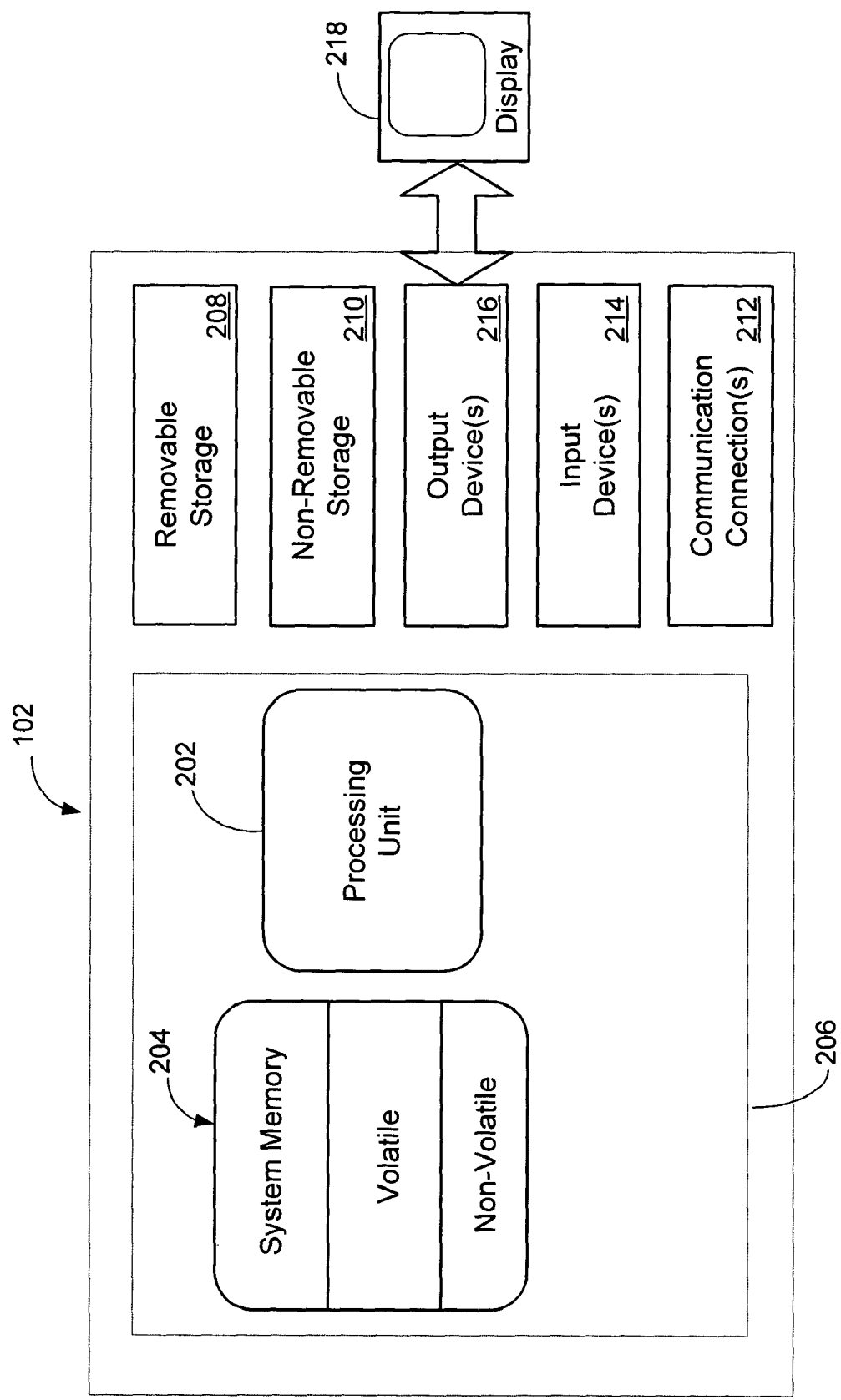
FIG. 2 is a schematic diagram illustrating an exemplary computer system usable to implement an embodiment of the invention.

Referring to FIG. 2, an example of a basic configuration for a computer on which all or parts of the invention described herein may be implemented is shown. In its most basic configuration, the computer 102 typically includes at least one processing unit 202 and memory 204. The processing unit 202 executes instructions to carry out tasks in accordance with various embodiments of the invention. In carrying out such tasks, the processing unit 202 may transmit electronic signals to other parts of the computer 102 and to devices outside of the computer 102 to cause some result. Depending on the exact configuration and type of the computer 102, the memory 204 may be volatile (such as RAM), non-volatile (such as ROM or flash memory) or some combination of the two. This most basic configuration is illustrated in FIG. 2 by dashed line 206.

The computer 102 may also have additional features/functionality. For example, computer 102 may also include additional storage (removable 208 and/or non-removable 210) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

Computer 102 preferably also contains communications connections 212 that allow the device to communicate with other devices. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wired media such as a wired network or direct-wired connection, and wireless media such as acoustic, RF, infrared and other wireless media. The term "computer-readable medium" as used herein includes both computer storage media and communication media.

Computer 102 may also have input devices 214 such as a keyboard, mouse, pen, voice input device, touch input device, etc. Output devices 216 such as a display 218, speakers, a printer, etc. may also be included. All these devices are well known in the art and need not be discussed at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Client Side Monitoring

An embodiment of the present invention is directed to a system and method for allowing a server to collect information on actual end-user client experience by, for example, recording request/response (e.g., RPC) latencies and errors observed by the client (e.g., an e-mail client). Information collected may be forwarded via a reporting mechanism to the server for use, for example, in identifying particular connections or configurations having high levels of error or long latencies. Additional information related to the client-perceived availability of the system may also be captured. For ease of description, the embodiments are described with reference to an e-mail client server environment, however, as will be appreciated by one of skill in the art, the features described herein are applicable to a variety of client server environments.

Figure 3:
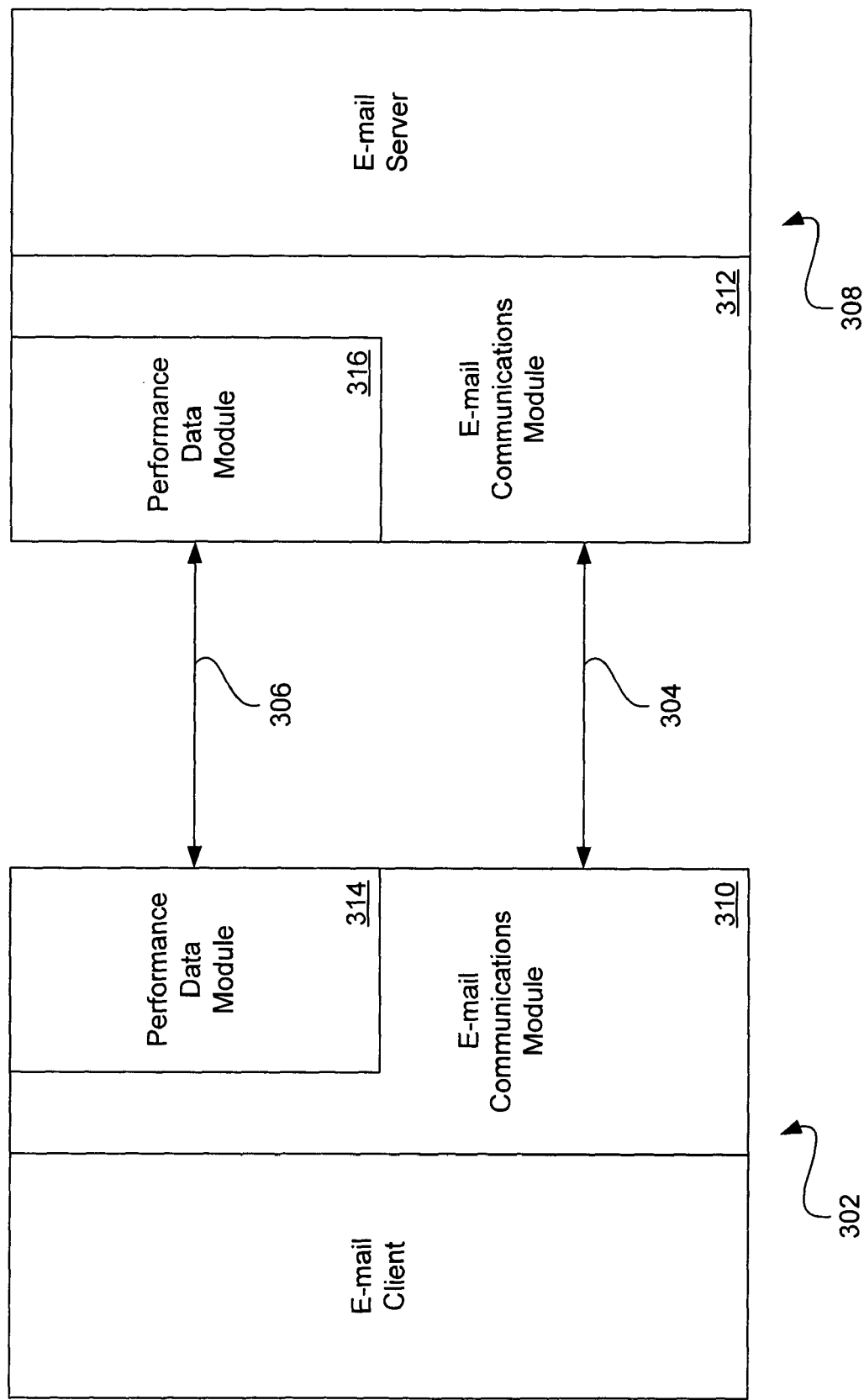
FIG. 3 is a high-level schematic diagram of an exemplary client server architecture in accordance with an embodiment of the invention.

FIG. 3 shows an exemplary client server architecture suitable for implementing an embodiment of the invention. An e-mail client 302 utilizes remote procedure calls (RPCs) 304, 306 to access e-mail server 308 functionality. The e-mail client 302 incorporates an e-mail communications module 310 that provides, for example, the ability to establish a network connection with the e-mail server 308, and manages the details of sending and receiving RPCs across the network connection. The e-mail server 308 incorporates a corresponding e-mail communications module 312 that provides, for example, the ability to accept incoming connection requests from the e-mail client 302, as well as receiving incoming an RPC request, interpreting the RPC request such that it is associated with a procedure call that is local to the e-mail server 308, calling the local procedure call, and sending the results of the local procedure call back to the e-mail client 302 in an RPC response. The use of RPCs to facilitate client server communication is known in the art and need not be further detailed here. The e-mail client 302 and the e-mail server 308 typically utilize their respective e-mail communications modules 310, 312 to communicate, although they are not so limited.

In an embodiment of the invention, the e-mail client's e-mail communications module 310 incorporates a client-side performance data module 314 that provides for client-side monitoring and reporting of the performance of client server interactions. The client-side performance data module 314 is described in more detail herein with reference to FIG. 4. The e-mail server's e-mail communications module 312 incorporates a corresponding server-side performance data module 316 that collects and aggregates performance data sent by the client-side performance data module 314. The server-side performance data module 316 is described in more detail herein with reference to FIG. 5.

The RPCs 304 may not incorporate performance data. The RPCs 306 may incorporate performance data. Typically, when both client and server incorporate performance data modules 314, 316, that client and server utilize RPCs 306 incorporating performance data when communicating. However, the e-mail server 308 may specify that RPCs 304 not incorporating performance data be utilized when communicating, in order, for example, to increase communications performance, particularly on low bandwidth network connections. The transmission of performance data may increase client server communications overhead. In addition, when the e-mail client 302 is communicating with an e-mail server (not shown in FIG. 3) that does not incorporate the server-side performance data module 316, the e-mail client 302 may utilize RPCs 304 not incorporating performance data to communicate with that e-mail server. Similarly, when the e-mail server 308 is communicating with an e-mail client (not shown in FIG. 3) that does not incorporate the client-side performance data module 314, the e-mail server 308 may utilize RPCs 304 not incorporating performance data to communicate with that e-mail client. In an embodiment of the invention, incorporating the performance data modules 314, 316 into the e-mail client 302 and the e-mail server 308 alleviates the need for additional, resource-consuming infrastructure.

Figure 4:
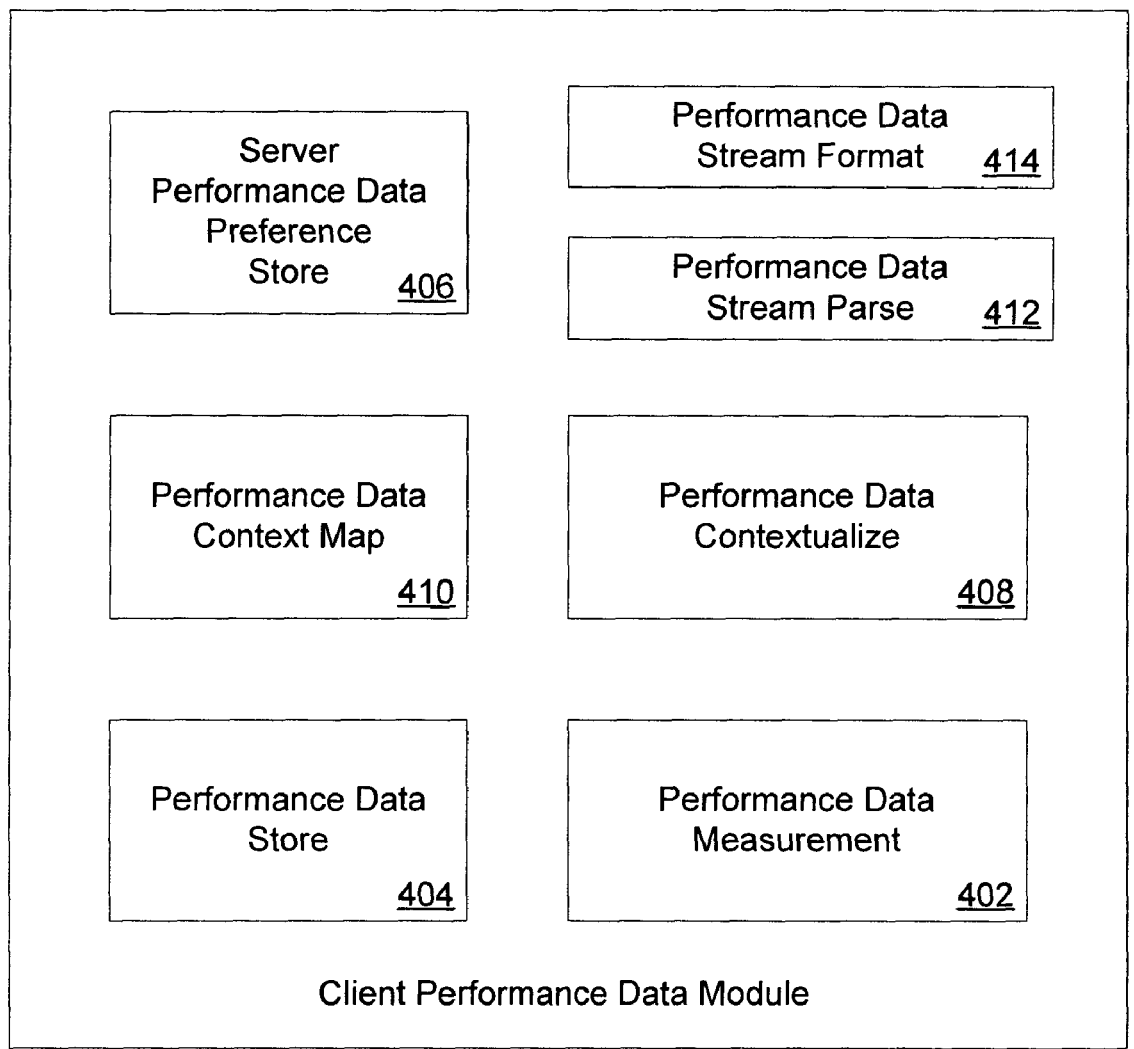
FIG. 4 is a schematic diagram of an exemplary client-side performance data module architecture in accordance with an embodiment of the invention.

FIG. 4 shows an exemplary client-side performance data module architecture suitable for incorporation in an embodiment of the invention. A performance data measurement module 402 generates performance data associated with RPCs, for example, RPC request initiation timestamps, corresponding RPC response received timestamps, RPC server-side processing elapsed times, and RPC error codes. The performance data measurement module 402 stores the performance data in a performance data store 404. Performance data regarding a particular RPC may be stored in the performance data store 404 until it is transmitted to the server in a later RPC, for example, the next RPC. Performance data regarding a particular RPC may be stored in the performance data store 404 until it is transmitted to a designated primary server and in the meantime copies of the performance data may be sent to non-primary servers. The performance data in the performance data store 404 may have an age associated with it and the performance data may be automatically deleted from the performance data store 404 when its age is above a configurable threshold, for example, a performance data age threshold specified by the server and stored in a client-side server performance data preference store 406.

A performance data contextualize module 408 determines performance data contexts and sub-contexts, for example, client information, server information, and connection information, assigns them a lightweight performance data context identifier and stores the identifier to context relationship in a performance data context map 410. Each determined performance data context may be flagged as 'sent' or 'not sent' to the server. If a performance datum references a performance data context that has not yet been sent to the server, the performance data context may be sent to the server before or along with the performance datum.

A performance data stream parse module 412 parses performance data related information encoded into the incoming data stream. For example, the server may incorporate performance data preferences into the reply to a Connect Request by the client. The performance data stream parse module 412 may parse out the performance data preferences and store them in the server performance data preference store 406. A performance data stream format module 414 formats performance data for transmission to the server. The server performance data preferences may control what performance data the performance data stream format module 414 inserts into the outgoing data stream. For example, the server may prefer that it receive performance data only with regard to communications between itself and the client, or the server may prefer to receive a copy of performance data regarding communications between the client and each of the servers with which the client communicates.

The performance data stream format module 414 formats performance data stored in the performance data store 404 for transmission to the server. In an embodiment of the invention, if a particular performance datum references performance data context that has an associated entry in the performance data context map 410, the performance data stream format module 414 checks the associated entry to determine if the performance data context has been transmitted to the server. If the performance data context has not yet been sent, the performance data context is inserted into the outgoing data stream before the particular performance datum. In an alternate embodiment, the performance data stream format module 414 incorporates the performance data contextualize module 408 and the performance data context is inserted into the outgoing data stream and the performance data context map 410 upon detection.

Figure 5:
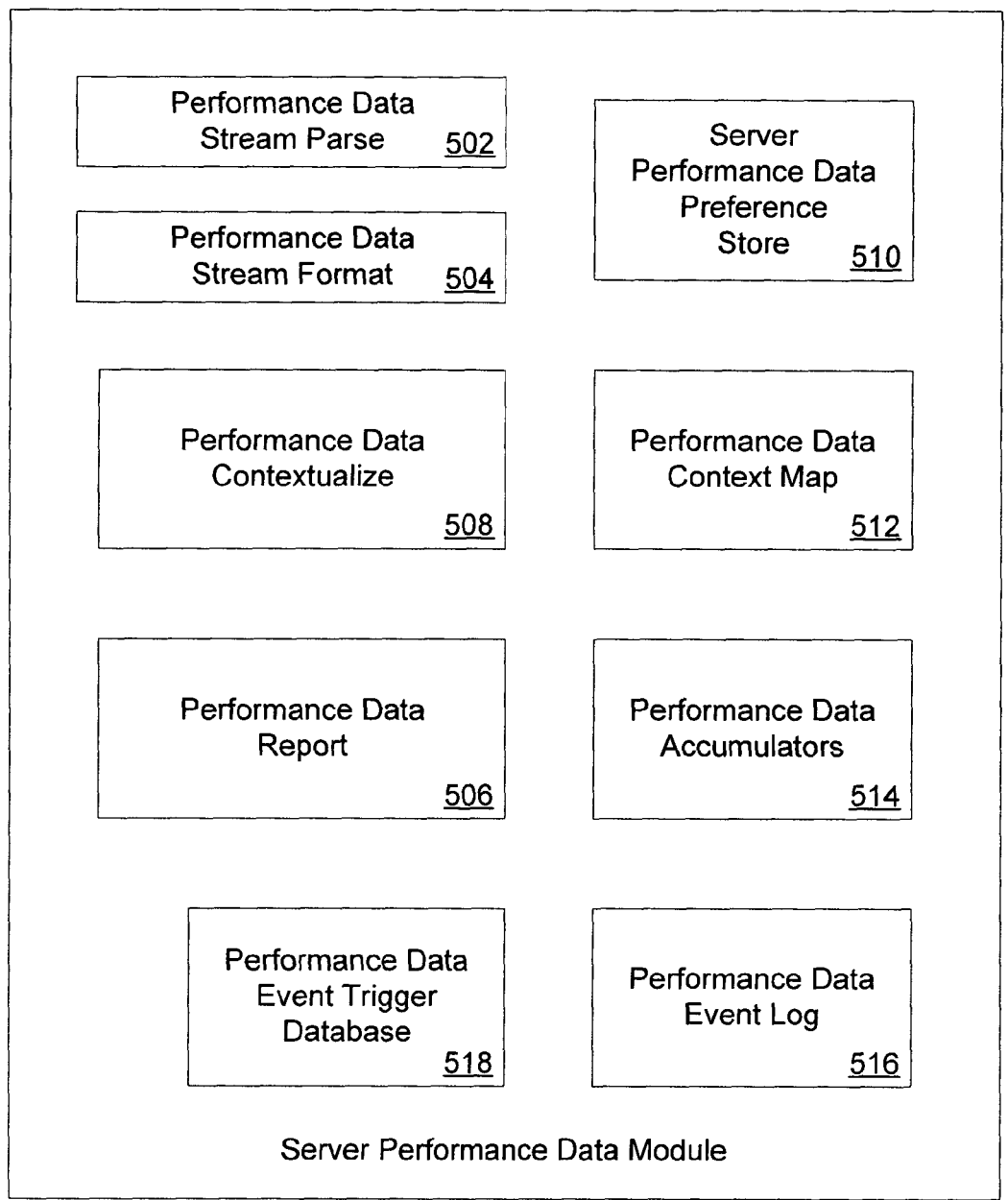
FIG. 5 is a schematic diagram of an exemplary server-side performance data module architecture in accordance with an embodiment of the invention.

FIG. 5 shows an exemplary server-side performance data module architecture suitable for incorporation in an embodiment of the invention. A performance data stream parse module 502 parses performance data incoming from clients. A performance data stream format module 504 formats performance data related information for transmission to clients. Parsed performance data may be passed to a performance data report module 506 for further processing. Parsed performance data context may be passed to a performance data contextualize module 508 for further processing. In reply to Connect Requests from clients, performance data preferences stored in a server-side server performance data preference store 510 may be formatted and inserted into the outgoing data stream by the performance data stream format module 504.

The performance data contextualize module 508 may build a performance data context map 512 including entries for each performance data enabled client. The performance data report module 506 utilizes lightweight performance data context identifiers in received performance data to reference performance data context stored in the performance data context map 512. The performance data report module 506 may log, in full, all the performance data received from each of the clients with which the server communicates, but typically (i.e., in a resource-constrained computer system) it does not. Typically, the performance data report module 506 adds the incoming performance data to per server and per client performance data accumulators 514. Full logging is typically restricted to particular clients and for a limited amount of time.

Performance data accumulators 514 updated by the performance data report module 506 may include simple totals (e.g., total requests), totals for a period (e.g., 1 second), totals for performance datum exceeding a threshold (e.g., RPC latency greater than 2 seconds), and statistical accumulators (e.g., maximum, minimum, average). Other suitable accumulators are possible as will be apparent to one of skill in the art. There may be a set of accumulators for each server with which a client of the server incorporating the performance data accumulators 514 interacts (i.e., per server accumulators), as well as a set of accumulators for each client of the server incorporating the performance data accumulators 514 (i.e., per client accumulators). Accumulator values may be made available, for example, to third party applications, by means of conventional computer system management instrumentation mechanisms, for example, a mechanism implemented utilizing the Microsoft® Windows® Management Instrumentation (WMI) framework. For details of the WMI framework see the Windows Management Instrumentation section of the February 2003 Microsoft® Windows® Platform Software Development Kit (SDK) documentation in the Microsoft® Developer Network (MSDN®) Library.

In addition to performance data accumulators 514, the performance data report module 506 may generate performance data events and enter them in a performance data event log 516. The performance data event log 516 may be incorporated into a standard computer operating system event log (e.g., the Microsoft® Windows NT® Event Log service). Criteria for generating a performance data event are stored in a performance data event trigger database 518. Examples of performance data event triggers are successful request percentage dropping below a threshold for a particular client or server, and average request latency rising above a threshold for a particular client or server. Other event trigger examples are described herein and, as will be apparent to one of skill in the art, other suitable event triggers are possible, in particular event triggers based on performance data accumulator 514 values crossing a threshold. The performance data report module 506 may limit the number of events issued during a given period of time by total events, event type, events regarding a particular server, client or user, and like criteria.

In an embodiment of the invention, the client may communicate with multiple types of servers (e.g., a mail or mailbox server, a public folder server, and a calendar/scheduling server). Administrators may nevertheless want client-perceived performance data with regard to client interactions with each of these different servers. In an embodiment of the invention, one server may be configured to collect performance data regarding client interactions with each of the multiple severs. For example, performance data generated by client interactions with a public folder server or calendar/scheduling server may also be sent to the mailbox server. While sending some data to more than one server may increase storage requirements, it enables a consolidated view of everything a given user is experiencing on one server (e.g., the mailbox server) for detailed analysis.

Figure 6:
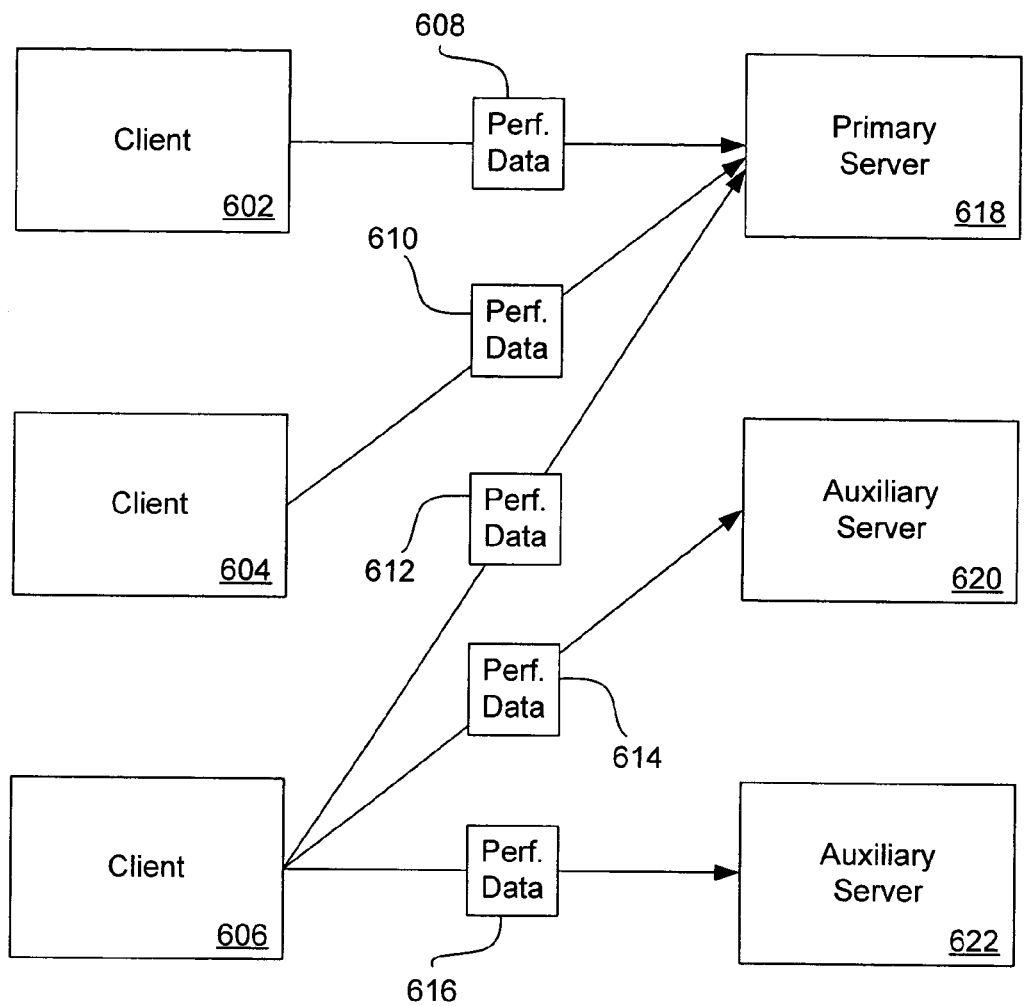
FIG. 6 is a schematic diagram illustrating an example client server environment suitable for incorporating aspects of the invention.

FIG. 6 shows clients 602, 604, 606 sending performance data 608, 610, 612, 614, 616 to multiple servers 618, 620, 622. In the example shown in FIG. 6, each client 602, 604, 606 is of the same type (e.g., an e-mail client). Each server 618, 620, 622 is of a different type (e.g., a mailbox server, a public folder server, a free busy server). Each server 618, 620, 622 collects performance data from at least one of the clients 602, 604, 606. In this example, each server 618, 620, 622 is configured to collect data regarding at least its own client-perceived performance for each client with which it interacts. One server 618 is designated as a primary server 618. The primary server 618 is configured to collect performance data, not only regarding its own interactions with clients 602, 604, 606, but also regarding each clients' 602, 604, 606 interactions with auxiliary (i.e., non-primary) servers 620, 622.

In the example shown in FIG. 6, the performance data 608 relates only to the client's 602 interactions with the server 618. Likewise, the performance data 610 relates only to the client's 604 interactions with the server 618. The performance data 614 relates only to the client's 606 interactions with the server 620. The performance data 616 relates only to the client's 606 interactions with the server 622. However, the performance data 612 incorporates data collected by the client 606 regarding interactions with the server 622, the server 620 and the server 618.

Many clients may communicate with a server over a low bandwidth high-latency connections. In an embodiment of the invention, a client may be configured to refrain from sending the performance data alone. Instead, the client may store the performance data until, for example, a subsequent request/response cycle is initiated with the server. The client may incorporate the stored performance data into the subsequent request, thereby potentially reducing some of the overhead associated with sending the client-perceived performance data to the server.

Figure 7:
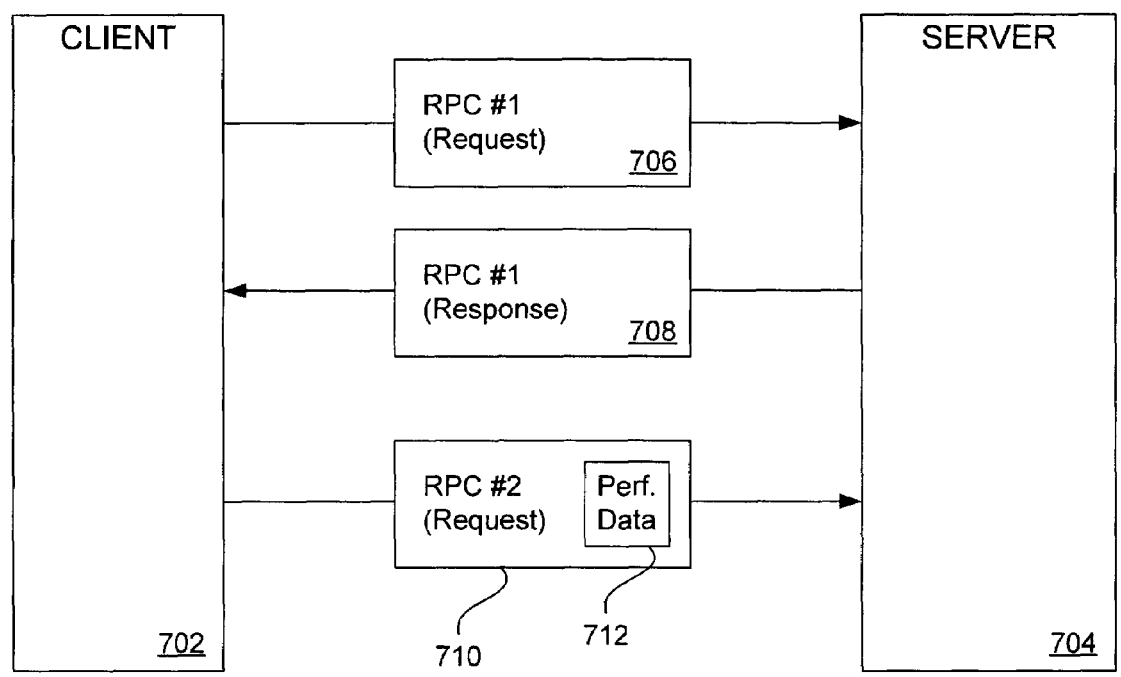
FIG. 7 is a schematic diagram illustrating an example of sending performance data pertinent to a particular request/response pair from a client to a server by incorporating the performance data into a subsequent request.

Turning now to FIG. 7, one example of sending information on a subsequent request/response cycle is illustrated. As shown in the figure, a client 702 is configured to communicate with a server 704 across a network connection. In this example, the client 702 is configured to use RPCs to request the execution of procedures on the server 704. The client 702 is a messaging client that utilizes RPCs to access e-mail stored on the server 704. As shown in the figure, the client 702 sends a first RPC request 706 to the server 704, and then the server 704 processes the request and responds back to the client with a first RPC response 708. When the client generates a second RPC request 710, the client incorporates performance data 712 into the second RPC request 710.

The performance data 712 provides particular information from the client's perspective regarding the performance of the system, for example, request/response latency, request/response error codes and/or the frequency of error codes. The client 702 may be configured to measure the time delay between when the first RPC request 706 is dispatched from the client 702 to the server 704 and when the corresponding first RPC response 708 is received by the client 702 from the server 704. The client may also determine which requests completed (i.e., received a corresponding response), and which ones did not. For example, part of a second RPC response (not shown in FIG. 7) for the second RPC request 710 may be lost en route from the server 704 to the client 702 (e.g., because of a network failure). Similarly, if the second RPC request 710 is lost in the network before the server 704 receives it, the client 702 will not receive the corresponding second RPC response. The client 702 may be in a better position than the server 704 to collect information on which RPCs succeed and which ones fail. Sending performance data regarding a first request/response cycle in a subsequent (e.g., next) request/response cycle may allow for sufficiently granular performance data 712 to be sent to the server 704 for analysis.

The server 704 may aggregate and/or summarize performance data with respect to multiple request/response cycles from one or more users (e.g., a user of the client 702), clients (e.g., the client 702), or even servers (e.g., the server 704). This information may advantageously allow system administrators to determine underlying causes for problems experienced by the one or more users, clients and/or servers.

Figure 8:
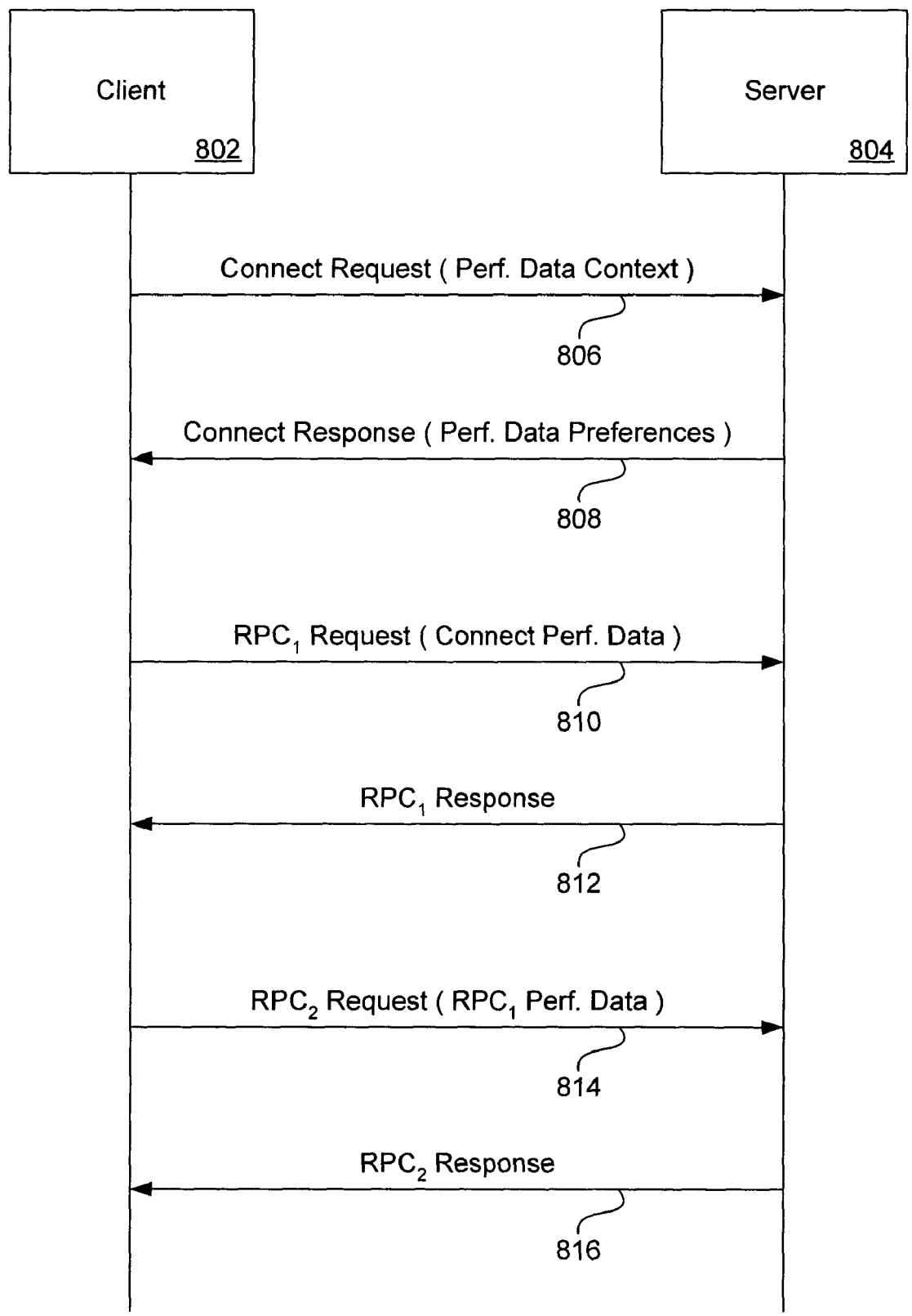
FIG. 8 is a protocol diagram illustrating an exemplary performance data transmission protocol in accordance with an embodiment of the invention.

FIG. 8 illustrates an example performance data transmission protocol in accordance with an embodiment of the invention. In FIG. 8, a client 802 communicates with a server 804, for example, the client 802 may be an e-mail client synchronizing a set of client-side e-mail folders with a set of e-mail folders stored on the server 804. The client 802 first sends a Connect Request 806 to the server 804. The Connect Request 806 incorporates conventional Connect Request parameters (e.g., user name, client version, and so on). In addition, the Connect Request 806 incorporates performance data context.

Each fully specified performance datum may include, for example, client details, server details and communications session details, as well as, for example, latency and/or error information. However, within a particular communications session there may be some details that do not vary. These session invariant details are performance data context. In an embodiment of the invention, the performance data context is transmitted only once, at the beginning of a session. In an alternative embodiment, the performance data context is transmitted only once, the first time that performance data is transmitted, which may or may not be the beginning of a session. Performance data context may include one or more sub-contexts, each of which may be transmitted separately. For example, if the client 802 is transmitting performance data to the server 804 regarding communications with another server (not shown in FIG. 8) then the client may, at that time, transmit that other server's details as a separate sub-context and thereafter refer to those details by utilizing a context identifier.

In an embodiment of the invention, transmitting performance data context only once results in a more efficient performance data transmission protocol. Further efficiencies are possible by designating a particular context identifier value to refer to implicit context details that do not need to be explicitly transmitted from client to server, for example, server details for the server receiving the request, session details for the current communications session, and so on.

In response to the Connect Request 806, the server 804 sends a Connect Response 808 to the client 802. In addition to conventional Connect Response parameters (e.g., server version), the Connect Response 808 incorporates the server's performance data preferences. Examples of the server's performance data preferences include: whether and under what conditions the client 802 should send performance data, whether the client 802 should send performance data related to communications with servers other than the server 804 and if so what types of servers, and how long to store performance data before it becomes too old to be of interest.

Once a connection has been established between the client 802 and the server 804, a first RPC request 810 is sent from the client 802 to the server 804. The first RPC request 810 incorporates conventional RPC parameters, for example, remote operation codes (ROPs) and associated parameters for the server 804 to process. In addition, in this example, the first RPC request 810 incorporates performance data related to the connect request/response cycle (i.e., Connect Request 806 and Connect Response 808). Examples of (non-context) performance data include latencies such as the time between the client 802 initiating the request 806 and the server 804 receiving it, the time between the server 804 receiving the request 806 and the server initiating the response 808, the time between the server 804 initiating the response 808 and the client 802 receiving it, as well as request error codes such as server busy, or server unavailable, and associated parameters. Latencies may be specified explicitly as elapsed time or implicitly utilizing timestamps. Another example of performance data suitable for incorporation into the first RPC request 810 is performance data related to RPC request/response cycles that took place during a previous connection.

In response to the first RPC request 810, the server 804 sends a first RPC response 812 to the client 802. In addition to conventional RPC response parameters such as ROP results, the first RPC response 812 may include a received_at_server timestamp and/or a server processing time parameter indicating the time taken to process the request, at the resolution of the server clock. In this example, the client 802 sends a second RPC request 814, which, in addition to conventional RPC parameters, incorporates performance data related to the first RPC request/response cycle (i.e., RPC request 810 and RPC response 812). Suitable performance data may be as compact as a roundtrip latency as measured by the client 802 and appropriate performance data context identifiers. The time at which a second RPC response 816 arrives at the client 802 is recorded so that performance data related to the second RPC request/response cycle can be sent to the server 804 with a later RPC request (not shown in FIG. 8).

The detailed information below, with reference to FIG. 9A and FIG. 9B, describes an embodiment utilizing a family of messaging servers, for example, the Microsoft® Exchange family of messaging servers and a messaging client, for example, a Microsoft® Outlook® messaging client. A mailbox server 902 receives and stores a user's e-mail. A free-busy server maintains a user's calendar (i.e., the dates and times that a user is free or busy). A public folder server 906 receives and stores e-mail addressed to a public folder or discussion topic rather than a particular user. A Global Catalog (GC) server maintains a user directory and may, for example, be a Microsoft® Windows NT® server. In an embodiment of the invention, the GC server is part of a directory service, for example, Microsoft® Active Directory®, responsible for storing information about each user and computer system, as well as additional organizational configuration at an enterprise level.

In an embodiment of the invention, there are two types of performance data which are sent: a connect-time type of performance data and a per-RPC type of performance data. FIG. 9A depicts data flow with respect to the connect-time type of performance data. FIG. 9B depicts data flow with respect to the per-RPC type of performance data.

When a connection is made to a messaging server 902, 904, or 906, client 908 information such as client name, IP address, and link speed may be sent to that server 902, 904, or 906. Further examples of client information include data fields such as:

1. Machine Name
2. User Name
3. Adapter Name
4. Adapter Speed (in kilobits per second)
5. MAC Address
6. Client IP Address
7. Session ID or Connection Handle
8. Client Subnet
9. Client Mode (e.g., cached or non-cached)

Such connect-time data may be stored in memory on the server 902, 904, or 906. The connection information may be saved regardless of whether the client 908 is subsequently instructed to send per-RPC performance data.

In an embodiment of the invention, the messaging server 902, 904, or 906 returns a performance data enable flag to the messaging client 908 indicating whether or not the server 902, 904, or 906 wants to receive the client monitoring (i.e., performance) data. This may be controlled on the messaging server 902, 904, or 906 by one or more registry keys. An example set of server-side performance data preference registry keys is:

1. Client Monitoring Report Level
2. Client Monitoring Max Low Bandwidth
3. Client Monitoring Enable Flags
4. Client Monitoring User List Mode
5. Client Monitoring User List
6. Client Monitoring Age Limit Minutes Registry keys may be updated by server administrators. In an embodiment of the invention, a Client Monitoring Report Level registry key may have three settings:

1. Collect performance data from all messaging clients (i.e., that support the feature, e.g., Microsoft® Outlook® version 11 messaging clients);
2. Collect performance data only from high bandwidth messaging clients (e.g., nominal bandwidth greater than 100 kb/sec); and
3. Do not collect data from any messaging clients.

Setting #1 may be the default setting. Settings other than #1, #2 or #3 may result in the default behavior. A decision as to whether the client 908 is a high or low bandwidth client may be governed by a network adaptor speed received from the client 908 at connect-time. The maximum bandwidth to be considered a low bandwidth connection may be specified (e.g., in bits per second) in a Client Monitoring Max Low Bandwidth registry key.

A Client Monitoring Enable Flags registry key may determine whether the error/latency data for client 908 interaction with the public folder server 906 and the free busy server 904 is sent to the mailbox server 902 as well as the other servers (906 and 904 respectively) in order to enable drilling down into customer issues on one server. For example, this registry key may have the following settings:

1=Basic monitoring: data from each server 902, 904 and 906 is sent only to that server 902, 904 or 906. No data is collected about RPCs to the GC server 910.

2=Basic+GC monitoring: data from the GC server 910 is sent to the mailbox server 902; and 3=Full monitoring: data from the mailbox server 902, the GC server 910, the public folder server 906 and the free busy server 904 is sent to the mailbox server 902 as well as each individual server 904 and 906 (except the GC server 910).

Basic mode (#1) may be the default setting. A registry key setting other than those listed (i.e., #1, #2, or #3) may result in the same behavior as for the default setting. There may be more than one server of each type. In this embodiment the mailbox server 902 plays the role of a primary server (as described with respect to FIG. 6) but the invention is not so limited. In this embodiment, GC server 910 does not collect performance data from any client, but in an alternative embodiment the GC server may collect performance data and/or another server type may not collect performance data.

In an embodiment of the invention, the performance data enable flag may be different for each client connection. In an embodiment of the invention, the performance data enable state is incorporated into the state of each open client connection. In an embodiment of the invention, the client 908 may independently initiate the sending of performance data regardless of registry key settings, for example, when the client 908 is experiencing service quality problems.

The server 902, 904, or 906 may be configured to return a flag or other information to the client 908 indicating whether or not the server 902, 904, or 906 wants to receive the client 908 monitoring data for the remainder of the connection. This may be implemented, for example, using a 4 byte flag that is sent back to the client 908 with the response for each RPC so that the client 908 may dynamically stop/start monitoring. This too may be controlled through several server registry keys (not shown in the example list above).

In an embodiment of the invention, a Client Monitoring User List registry key on the server 902, 904, or 906 may be used to define a list of users for which client-side performance monitoring is desired. The server 902, 904, or 906 may be configured to request that the client 908 send full monitoring information for each of the users in this list. The default behavior described by this registry key may be such that the server 902, 904, or 906, by default, instructs each of the clients with which it interacts (e.g., the client 908) to collect performance data. Alternatively, in an embodiment of the invention, a Client Monitoring User List Mode registry key determines the server 902, 904, or 906 behavior with respect to the user list with one of the following values:

1. Ignore User List. The user list has no influence on which clients (e.g., the client 908) are requested to send performance data.

2. Only User List. Only those clients (e.g., the client 908) listed on the client monitoring user list are requested to send performance data.

3. Not User List. All clients (e.g., the client 908) except those on the client monitoring user list are requested to send performance data.

The server 902, 904, or 906 may be further configured to return an "age out" time limit. This is the interval after which the client 908 should no longer send old performance data to the server 902, 904, or 906. In an embodiment of the invention, the interval may be set on the server 902, 904, or 906 using a Client Monitoring Age Limit Minutes registry key specifying the number of minutes after which the client 908 may dispose of old performance data without sending it to the server 902, 904, or 906. In one embodiment, the default value of the age out time limit is set to one week (e.g., 7*24*60 minutes).

Figure 10:
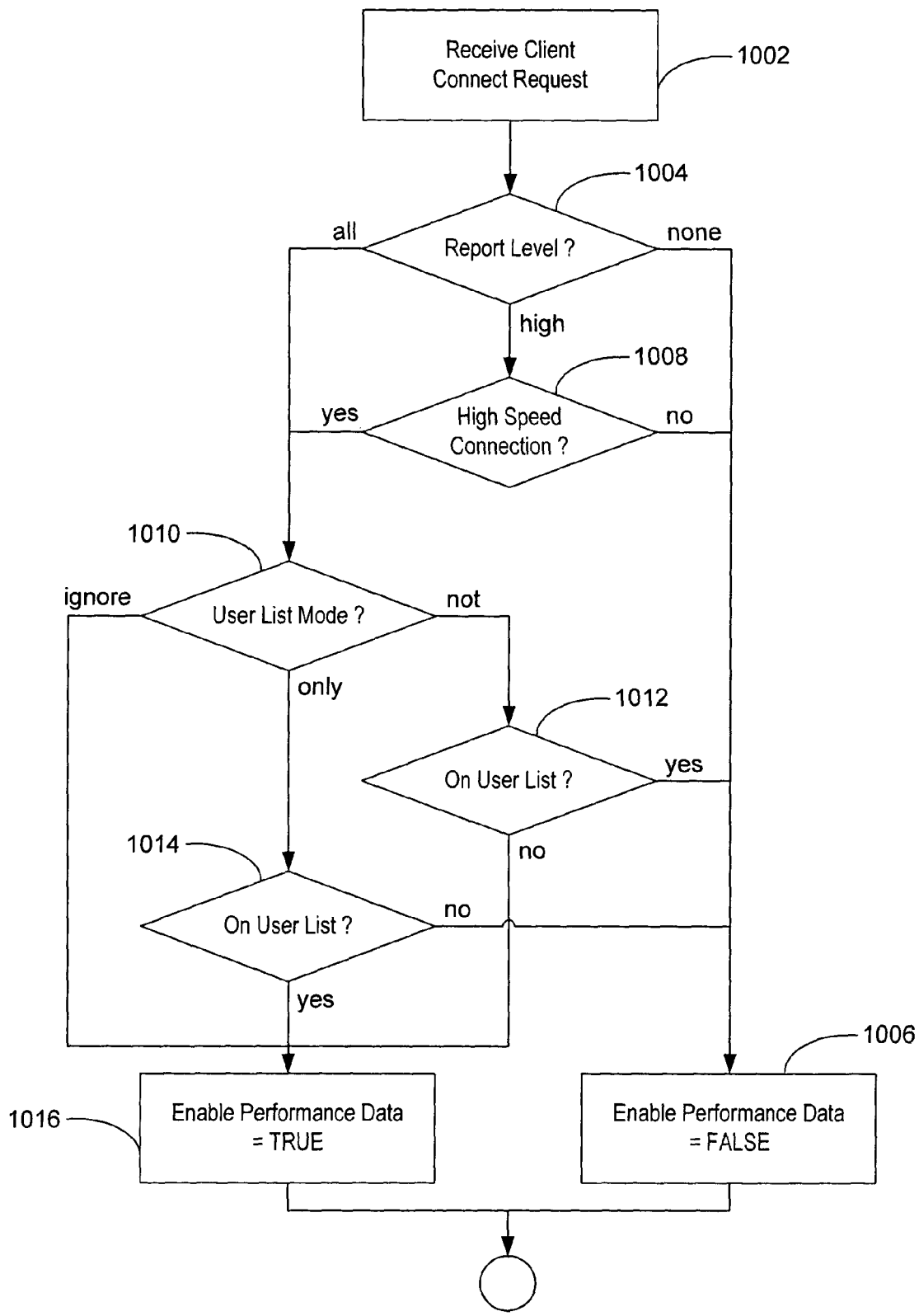
FIG. 10 is a flowchart depicting example steps performed by a server-side performance data module when enabling performance data reporting for a particular client in accordance with an embodiment of the invention.

FIG. 10 depicts an example server-side performance data module procedure that utilizes some of the above described registry keys when enabling performance data reporting for a particular client in accordance with an embodiment of the invention. At step 1002, the module (e.g., the performance data module illustrated in FIG. 5) receives a client (e.g., the client 302 of FIG. 3) connect request. At step 1004, the module checks the Client Monitoring Report Level registry key. If the report level is set to 'none', the procedure progresses to step 1006. At step 1006, the performance data enable flag to be sent to the client is set to FALSE. If the report level is set to 'high', the procedure progresses to step 1008. At step 1008, the client's adapter speed, as specified by the client in the client connect request, is compared to the value in the Client Monitoring Max Low Bandwidth registry key. If the adapter speed is less than the key value, the client is not a high bandwidth client and the procedure progresses to step 1006. Otherwise, the procedure progresses to step 1010 where the Client Monitoring User List Mode registry key is examined.

If the user list mode is "Not User List," the procedure progresses to step 1012. If the user list mode is "Only User List," the procedure progresses to step 1014. If the user list mode is "Ignore User List," the procedure progresses to step 1016 and the user list has no further influence with regard to enabling performance data reporting for the client. At both step 1012 and step 1014, the procedure examines the Client Monitoring User List registry key for the user name (as specified in client connect request). At step 1012, if the user name is on the list, then it is not desirable that performance data reporting be enabled for the client and the procedure progresses to step 1006. In contrast, as step 1014, if the user name is on the list, then it is desirable that performance data reporting be enabled for the client and the procedure progresses to step 1016. At step 1016, the performance data reporting flag sent back to the client in response to the client connect request is set to TRUE.

Data Potentially Incorporated into Each Request/Response Cycle

Figure 9A:
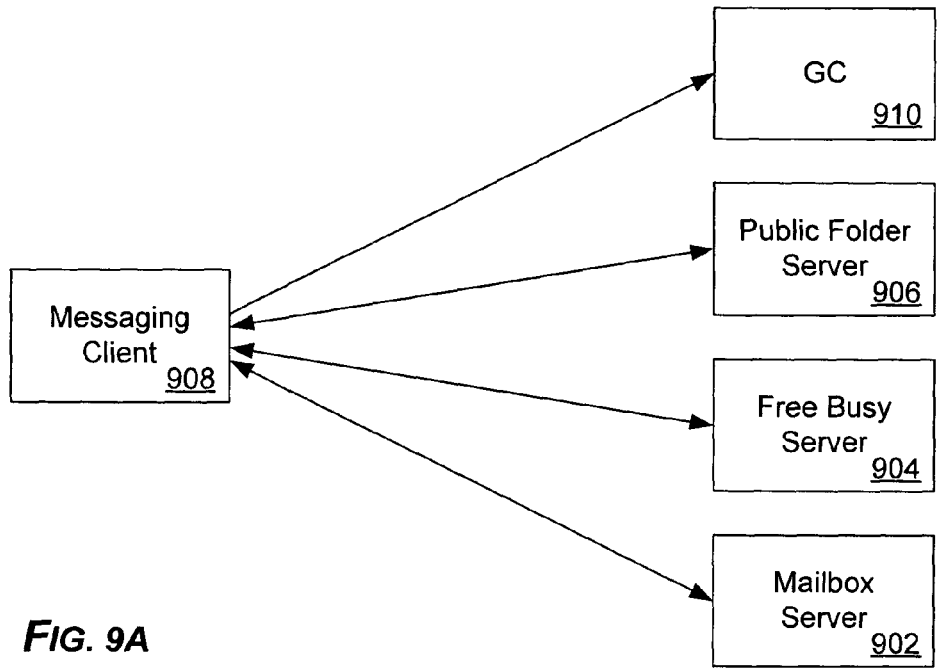
FIG. 9A is a data flow diagram illustrating an example of a connection type of performance data flow in accordance with an embodiment of the invention.
Figure 9B:
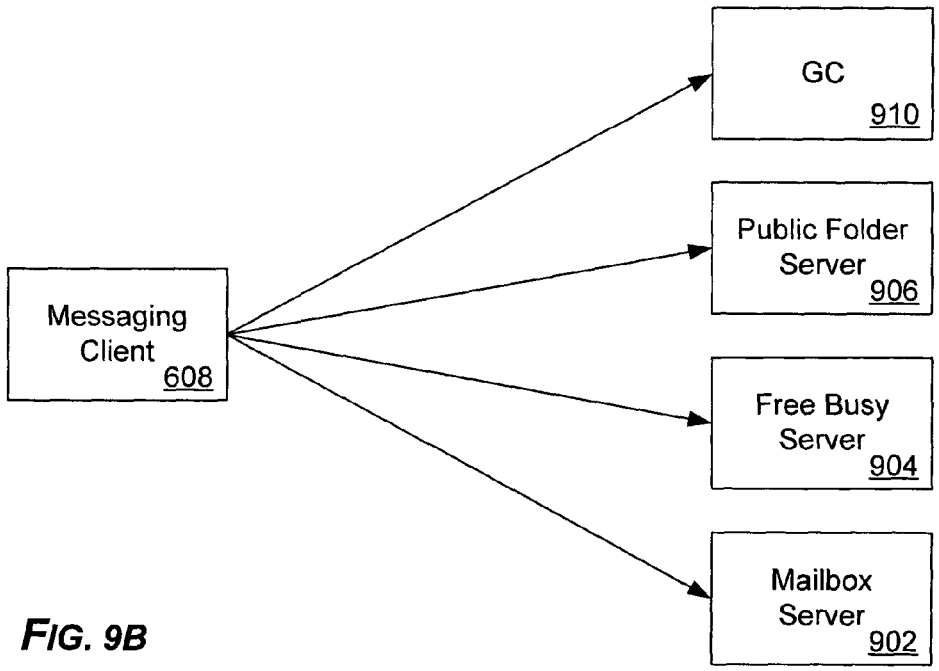
FIG. 9B is a data flow diagram illustrating an example of a per-RPC type of performance data flow in accordance with an embodiment of the invention.

With further reference to FIG. 9A and FIG. 9B, the messaging client 908 records the time that an RPC request is initiated as well as the time that the corresponding RPC response arrives from the messaging server 902, 904, or 908 and/or an RPC error code. The performance data incorporated into each RPC will typically be the error/latency data from the previous RPC to that messaging server 902, 904, or 908. In one embodiment this adds 14 bytes to the RPC (e.g., structured according to the EXCHANGEPREF_HEADER and EXCHANGEPERF_STAT_DEFMDB_SUCCESS data structures discussed below). In an embodiment of the invention, the messaging client 908 is capable of persisting performance data in the event of a delay between RPCs.

Additionally, the data about RPCs sent to public folder servers 906, free-busy servers 904, Global Catalog servers (GCs) 910 or other application servers (not shown in FIG. 6) may also be sent to the mailbox server 902, so that the mailbox server 902 serves as a central collection point for client-perceived performance data. In the case that the mailbox server 902 serves as a central collection point for performance data regarding other servers, the server name and information may also be specified in per-RPC performance data (this can add some more traffic to the network), for example:

- 14 bytes (e.g., structured according to the EXCHANGEPREF_HEADER and EXCHANGEPERF_STAT_DEFMDB_SUCCESS data structures);
- 6 bytes to identify the server (e.g., structured according to the EXCHANGEPREF_DEFINE_SERVERINFO data structure); and
- 22 bytes to identify the client (e.g., structured according to the EXCHANGEPREF_DEFINE_CLIENTINFO data structure).

This results in a total of 42 bytes plus any strings such as user name or server name. The appropriate fields of this data may be added to per-server performance counters (detailed below) and aggregated per user over user-specified time periods to generate the per-user and per-server warning events.

In an embodiment of the invention, the performance data is prefaced with information regarding the version, format, and/or size of the performance data. This information may be provided, for example, by an RpcHeaderExt tag including a performance data version field, a performance data format flags field, and a performance data size field. The performance data format flags may include a compress performance data flag, in which case the RpcHeaderExt tag may further include a performance data uncompressed data size field. Data compression technologies are well known in the art and need not be detailed here.

In an embodiment of the invention, the RpcHeaderExt tag is followed by one or more performance data blocks, each block including a performance data block header (e.g., the EXCHANGEPREF_HEADER data structure described below) and a performance data block body (e.g., one of the data structures enumerated in EXCHANGEPREF_BLOCKTYPE, described below). An example of performance data formatted for transmission from the messaging client 908 to the messaging server serving as a mailbox server 902 is:

```
RpcHeaderExt
    EXCHANGEPERF_HEADER
        EXCHANGEPERF_DEFINE_CLIENTINFO
    EXCHANGEPERF_HEADER
        EXCHANGEPERF_DEFINE_SERVERINFO
    EXCHANGEPERF_HEADER
        EXCHANGEPERF_DEFINE_SESSIONINFO
    EXCHANGEPERF_HEADER
        EXCHANGEPERF_REQUESTID
    EXCHANGEPERF_HEADER
        EXCHANGEPERF_STAT_DEFMB_SUCCESS
```

In the above example, each of EXCHANGEPERF_DEFINE_CLIENTINFO, EXCHANGEPERF_DEFINE_SERVERINFO, and EXCHANGEPERF_DEFINE_SESSIONINFO, are examples of performance data context which may be persisted by the messaging server 902, 904, or 906 and later referred to utilizing (for example, 2 byte) performance data context identifiers.

In an embodiment of the invention, the client-perceived service availability measure based on the number of failures on the client side is sometimes not equivalent to the server 902, 904, or 906 availability, (defined as the fraction of time that the server is functioning) due to the sometimes strong correlation between client behavior and server state. Two typical scenarios in which this correlation can distort the measurement are: in response to an unresponsive server 902, 904, or 906, the client 908 may 1) increase the retry frequency, resulting in multiple error reports for a single period of outage; or 2) shutdown the client 908 completely for an unknown period during which no error is reported.

In an embodiment of the invention, to precisely measure the server 902, 904, or 906 availability via a statistical method, the client 908 is configured to generate samples that are de-coupled with server 902, 904, or 906 state.

In some implementations, administrators should be cautious when interpreting the resulting data, since the client 908 may not always correctly identify the source of a failure. The client 908 may erroneously attribute failures to the server 902, 904, or 906 in some circumstances. One possible example of this may occur in a network in which a notebook (i.e., portable) computer system hosting the client 908 is brought out of the range of a wireless network and later reports network errors. While these misleading reports are typically a small problem that is easily identified by the administrator reviewing the accumulated performance data at the server 902, 904, or 906, an improved client 908 could conceivably be configured to query the operating system and use information from the operating system to reduce spurious error transmissions. Similarly, in some embodiments the client 908 may be configured to recognize versions of the servers 902, 904, or 906 that do not support this spurious error filtering functionality and refrain from posting particular types of performance data to those servers 902, 904, or 906.

Publishing the Data from the Servers

The server may be configured to publish accumulators (i.e., counters) populated with the accumulated performance data from the clients. In an embodiment of the invention, by sampling a set of performance counters at appropriate times, an administrator obtains detailed information available about the numbers of various kinds of failures across the installation. The administrator may configure one or more client-perceived service quality indicators for the server such as a client-perceived service availability measurement, e.g., percentage of failed RPC requests during a given time period such as one day. The table below illustrates example accumulators that may be published by the server.

| | Example Total RPC counters | |
|---|---|---|
| 1 | Client: RPCs attempted | The client-reported total number of RPCs attempted by the users (since the data store was started). |
| 2 | Client: RPCs succeeded | The client-reported total number of successful RPCs (since the data store was started). |
| 3 | Client: RPCs failed | The client-reported total number of failed RPCs (since the data store was started). |
| 4 | Client: RPCs failed: Server unavailable | The client-reported number of failed RPCs (since the data store was started) due to the Server Unavailable RPC error. |
| 5 | Client: RPCs failed: Server too busy | The client-reported number of failed RPCs (since the store was started) due to the Server Too Busy RPC error. |
| 6 | Client: RPCs failed: all other errors | The client-reported number of failed RPCs (since the data store was started) due to all other RPC errors. |

-continued

Example RPC rate counters

| 7 | Client: RPCs attempted / sec | The client-reported rate of RPCs attempted by the users. |
| 8 | Client: RPCs succeeded / sec | The client-reported rate of successful RPCs. |
| 9 | Client: RPCs failed / sec | The client-reported rate of failed RPCs. |
| 10 | Client: RPCs failed / sec: Server unavailable | The client-reported rate of failed RPCs (since the data store was started) due to the Server Unavailable RPC error. |
| 11 | Client: RPCs failed / sec: Server too busy | The client-reported rate of failed RPCs (since the store was started) due to the Server Too Busy RPC error. |
| 12 | Client: RPCs failed / sec: all other errors | The client-reported rate of failed RPCs (since the data store was started) due to all other RPC errors. |

Example total latency (for reporting)

| 13 | Client: Total reported latency | The client-reported total latency (in seconds) for all RPCs (since the data store was started). |

Example long latency RPC counters

| 14 | Client: Latency > 2 sec RPCs / sec | The client-reported rate of successful RPCs with latencies > 2 seconds. |
| 15 | Client: Latency > 5 sec RPCs / sec | The client-reported rate of successful RPCs with latencies > 5 seconds. |
| 16 | Client: Latency > 10 sec RPCs / sec | The client-reported rate of successful RPCs with latencies > 10 seconds. |

Sample rapid feedback counters for live monitoring

| 17 | Client: Fraction of failed RPCs / sec | The client-reported fraction of failed RPCs per second. |
| 18 | Client: Longest RPC Latency | The client-reported longest RPC latency for the last 1024 RPCs |
| 19 | Client: Average RPC Latency | The client-reported average RPC latency for the last 1024 RPCs |

Performance Data Events

In an embodiment of the invention, the server may be configured to fire (i.e., enter) warning events into the server's event log based on client-sent statistics, for example, the percentages of failed and slow RPC requests, either for the server as a whole (per-server) or for a particular user (per-user). The client-sent information may be digested (i.e., mathematically transformed, sorted into categories and/or buckets, etc.) and aggregated with respect to multiple servers, if desired. The server may be configured to alert the administrator with cumulative statistics. For example, the server may report to the administrator that "In the past 30 minutes, 50% of user John Doe's RPC requests have failed due to error RPC_ACCESS_DENIED," or "In the past 30 minutes, the average of user John Doe's RPC latency is 30 seconds." Specific settings may be configurable via server registry keys.

For example, server registry keys may be used to set the following values for per-user events:

1. The number of minutes over which to aggregate data for each client (0 or registry key not set means do not give any per-user events);
2. The minimum number of RPCs required before the server will consider creating a warning event;
3. The minimum RPC success percentage expected for a given client;
4. The maximum acceptable RPC latency in seconds;
5. The maximum number of warnings that can be issued in a given minute (to prevent event storms); and
6. The number of seconds over which the limit is applied before starting to issue warnings events again.

For example, the server may be configured to refrain from issuing any events if RPC Attempted is less than #2 in the list above. Otherwise, a warning event would be issued if RPC Succeeded/RPC Attempted is less than #3 in the list above. The warning event may include detailed information regarding the client that generated the problematic data (e.g., machine name, client IP address, subnet address). Similarly, a different warning event/message may be generated if the RPC Total Request Time/RPC Succeeded is greater than #4 in the list above.

If more warning events than specified in #5 in the list above occur within the time specified in #6, then the server may suppress issuing more warning events until a new period of time specified in #6 begins. A warning may be issued to identify this condition. In an embodiment of the invention, in order to avoid an avalanche effect in the event of a widespread error, real-time error/warning notification mechanisms are avoided.

Per-Server Warning Events

Other threshold values for per server events may be used to generate additional warnings or reports. For example, the following values may be set (e.g., via registry keys):

1. The number of minutes over which to aggregate data for each server (0 or not set means do not give any per-server events);
2. The minimum number of RPCs required before the server will consider creating a warning event;
3. The minimum success percentage expected for a given server;
4. The maximum acceptable RPC latency in seconds.

In an embodiment of the invention, per server warning events may be suppressed if the number of RPC Attempted is less than #2 in the list above. Warning events may be generated if the number of RPC Succeeded/RPC Attempted is less than #3 in the list above. Similarly, warning events may be generated if the RPC Total Request Time/RPC Succeeded greater than #4 in the list above.

Event Tracing

In an embodiment of the invention, the raw client data is made available for logging to aid testing. Examples of the data logged may include all of the machine and user specific information (user name, machine name, IP address, subnet, client version, adaptor speed, session id, and so on), as well as the per-RPC performance data such as latency and RPC error codes.

Listed below is a set of sample reports that can be generated using this data.

Summary Report:

| Server | Total Attempted RPCs | Failed RPCs | Client Perceived Availability | Average RPC latency (milliseconds) | Fraction of RPCs with latency > 2 seconds | Fraction of RPCs with latency > 5 seconds | Fraction of RPCs with latency > 10 seconds |
|---|---|---|---|---|---|---|---|
| Svr1 | 18,309,673 | 15412 | 99.92% | 356 | 4.1% | 1.53% | .05% |
| Svr2 | 6,438,609 | 4556 | 99.93% | 289 | 3.8% | 1.02% | .05% |

Error Detail Report:

| Server | Total Attempted RPCs | Failed RPCs | Client Perceived Availability | Average RPC latency (milliseconds) | Fraction of RPCs with latency > 2 seconds | Fraction of RPCs with latency > 5 seconds | Fraction of RPCs with latency > 10 seconds | RPC error types observed | # failures / RPC error type |
|---|---|---|---|---|---|---|---|---|---|
| Svr1 | 18,309,673 | 15412 | 99.92% | 356 | 4.1% | 1.53% | .05% | SERVER_TOO_BUSY | 99 |
|  |  |  |  |  |  |  |  | NETWORK_ERROR | 21 |
|  |  |  |  |  |  |  |  | Other Errors | 3 |
| Svr2 | 6,438,609 | 4556 | 99.93% | 289 | 3.8% | 1.02% | .05% | SERVER_TOO_BUSY | 99 |
|  |  |  |  |  |  |  |  | Other errors | 21 |

In an embodiment of the invention, a failed RPC is a RPC in which the response did not fulfill the request, for example, the response was an error code, the response was invalid, the response was corrupt (e.g., as detected by a checksum), the response did not occur within an acceptable amount of time and/or the response never occurred.

Scalability

In an embodiment of the invention, all operations except raising events in the event log are purely in memory. Thus, little information is persisted in the database. The performance counters may be implemented using simple accumulation types which do not require a time history.

In a preferred embodiment, server-side aggregation work is non-blocking. As noted above, the nature of the performance counters allows them to preferably be implemented using simple accumulation operations (e.g., they are aggregated among all users by simply summing up the numbers from all users to give the total count).

Details of One Example of a Server Data Store Implementation

Figure 11:
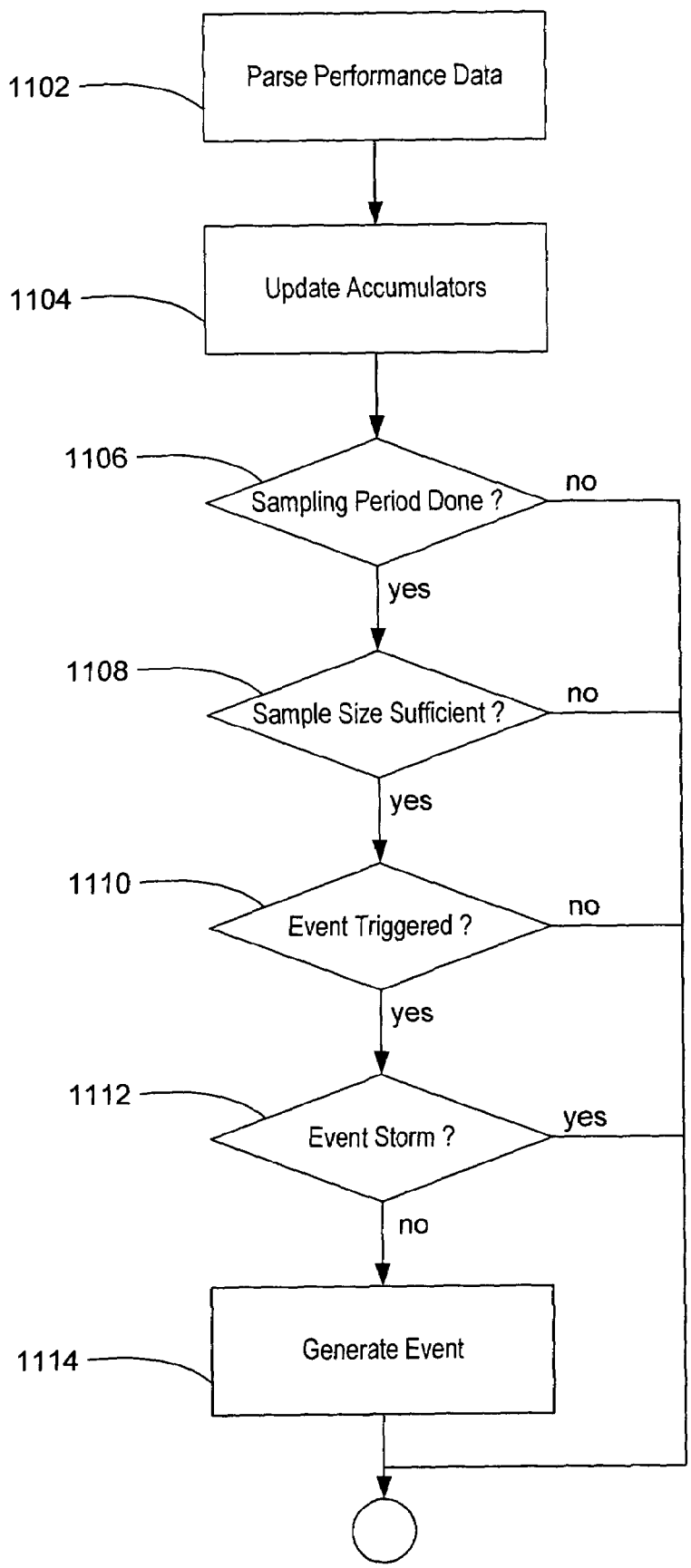
FIG. 11 is a flowchart depicting example steps performed by a server-side performance data module when triggering a performance data event in accordance with an embodiment of the invention.

FIG. 11 depicts an example procedure for triggering events in accordance with an embodiment of the invention. In an embodiment of the invention, a server-side performance data module (e.g., the performance data module illustrated in FIG. 5) incorporates counters (for examples see the accumulator list above) to track a number of attempted RPCs, successful RPCs, failed RPCs in pre-defined categories, latency buckets, and the time that the counters were previously examined. At step 1102, the module parses incoming client-generated and formatted performance data, and, at step 1104, updates the counters with the parsed data. At step 1106, the module compares the current time with the last report (i.e., update) time and simply returns (i.e., exits the procedure) if the time difference is smaller than a configured (e.g., utilizing a registry key) performance data sampling period interval. Otherwise, at step 1108, the module checks if a sufficient number (e.g., as configured by a registry key) of RPCs have been sampled. If so, at step 1110, the module decides whether or not to fire (i.e., trigger) events based on, for example, latency and error counts crossing configured thresholds (e.g., as specified by one or more registry keys). The module may then add the per-connection counters to a set of global counters which are exposed as performance counters, zero the per-connection counters and set the last report time. A global ULONG (i.e., unsigned long) counter may be used to keep track of total latency in milliseconds.

To prevent event storming, two static counters may be used to keep track of the number of performance data events fired during a configured (e.g., utilizing a registry key) period. At the end of the configured period, these two counters are re-initialized. At step 1112, before a performance data event is fired, the counter corresponding to the event type is decremented, and the event is not fired if the counter value is less than zero. Otherwise, the procedure progresses to step 1114 where the event is generated.

Example Data Structures

In an embodiment of the invention, one or more of the following data structures may be used to incorporate performance data into an RPC. In what follows, data structures are described with C programming language idioms known in the art. Additional details and description context may be found in the Remote Procedure Call section of the February 2003 Microsoft® Windows® Platform Software Development Kit (SDK) documentation in the Microsoft® Developer Network (MSDN®) Library.

In an embodiment of the invention, each performance data block starts with the following header:

```
typedef struct
{
    unsigned short    wSize;
    unsigned byte     bVersion;
    unsigned byte     bType;
} EXCHANGEPERF_HEADER;
```

The header may be followed by exactly one structure of one of the following types:

```
typedef enum
{
    EXCHANGEPERF_BLOCKTYPE_REQUESTID = 1,
    EXCHANGEPERF_BLOCKTYPE_CLIENTDEF,
    EXCHANGEPERF_BLOCKTYPE_SERVERDEF,
    EXCHANGEPERF_BLOCKTYPE_SESSIONDEF,
    EXCHANGEPERF_BLOCKTYPE_DEFMDB_SUCCESS,
    EXCHANGEPERF_BLOCKTYPE_DEFGC_SUCCESS,
    EXCHANGEPERF_BLOCKTYPE_MDB_SUCCESS,
    EXCHANGEPERF_BLOCKTYPE_GC_SUCCESS,
    EXCHANGEPERF_BLOCKTYPE_FAILURE,
    EXCHANGEPERF_BLOCKTYPE_MAX,
} EXCHANGEPERF_BLOCKTYPE;
```

The type of the data structure to follow the header may be specified in the "bType" parameter. The size in the header indicates the entire size of that block including the header, the structure following the header, and any data following that structure (such as strings). The version parameter is the performance data format version. Including a version parameter enables arbitrary improvement of the performance data transmission protocol while maintaining backward compatibility (i.e., compatibility with earlier versions of the protocol). In the cases that the client and/or server, etc. information (i.e., performance data context) need to be included in the data block, they may be included at the beginning of the buffer and referred to by the corresponding identifier (ID) field.

An example of a client server request identifier (ID) performance data block body data structure is:

```
typedef struct
{
    unsigned short    wGenID;
    unsigned short    wUnique;
} EXCHANGEPERF_REQUESTID;
```

Where wGenID is an identifier of a request ID generator, and wUnique is a request serial number generated by the request ID generator.

Another example of a client server request identifier (ID) performance data block body data structure suitable for incorporation in an embodiment of the invention is:

```
typedef struct
{
    unsigned short    wSessionID;
    unsigned short    wRequestID;
} EXCHANGEPERF_REQUESTID;
```

Where wSessionID is a client server communications session ID, and wRequestID is a serial number of a client server request unique to the current client server communications session.

An example of a client server communications session performance data block body data structure is:

```
typedef struct
{
    unsigned short    wSessionID;
    GUID              guidSession;
} EXCHANGEPERF_DEFINE_SESSION;
```

Where guidSession is the globally unique identifier (GUID) of the client server communications session, and wSessionID is a lightweight (i.e., 2 byte) client server communications session identifier associated with the heavyweight (e.g., 16 byte) guidSession. The general use of GUIDs in a distributed computing environment is known in the art.

Another example of a client server communications session performance data block body data structure is:

```
typedef struct
{
    unsigned short    wSessionID;
    GUID              guidSession;
    unsigned long     ulConnectionID;
} EXCHANGEPERF_DEFINE_SESSION_V2;
```

Where the same named fields have the same meaning as in the previous example, and ulConnectionID is an identifier of a client server communications connection. In an embodiment of the invention, there may be one or more communications sessions across a single communications connection.

An example of a client information performance data context block body data structure is:

```
typedef struct
{
    unsigned long     ulAdapterSpeed;
    unsigned short    wClientID;
    unsigned short    wOffsetMachineName;
    unsigned short    wOffsetUserName;
    unsigned short    cbClientIP;
    unsigned short    wOffsetClientIP;
    unsigned short    wOffsetAdapterName;
    unsigned byte     bMacAddress [6];
} EXCHANGEPERF_DEFINE_CLIENTINFO;
```

Where ulAdapterSpeed is a nominal bandwidth of the client's network adaptor, wClientID is a lightweight identifier associated with this performance data context block, wOffsetMachineName is an offset (in bytes) to a string containing a name of a computer system incorporating the client, wOffsetUserName is an offset to a string containing a name of a user of the client, cbClientIP is a size of the client's Internet protocol (IP) address, wOffsetClientIP is an offset to the client's IP address, wOffsetAdapterName is an offset to a string containing a name of the client's network adapter, and bMacAddress contains the client's Medium Access Control (MAC) address.

Another example of a client information performance data context block body data structure is:

```
typedef struct
{
    unsigned long     ulAdapterSpeed;
    unsigned short    wClientID;
    unsigned short    wOffsetMachineName;
    unsigned short    wOffsetUserName;
    unsigned short    cbClientIP;
    unsigned short    wOffsetClientIP;
    unsigned short    cbClientIPMask;
    unsigned short    wOffsetClientIPMask;
    unsigned short    wOffsetAdapterName;
    unsigned short    cbMacAddress;
    unsigned short    wOffsetMacAddress;
    unsigned short    wClientMode;
} EXCHANGEPERF_DEFINE_CLIENTINFO;
```

Where the same named fields have the same meaning as in the previous example, and cbClientIPMask is a size of the client's IP mask, wOffsetClientIPMask is an offset to the client's IP mask, cbMacAddress is a size of the client's MAC address, wOffsetMacAddress is an offset to the client's MAC address, and wClientMode indicates whether the client is operating in online mode, i.e., non-cached, all actions are live against the server, or cached mode, i.e., adaptive to low bandwidth network environments, in particular by replicating server-side information to a client-side cache when the network would otherwise be idle.

An example of a server information performance data context block body data structure is:

```
typedef struct
{
    unsigned short    wServerID;
    unsigned short    wServerType;
    unsigned short    wOffsetServerDN;
} EXCHANGEPERF_DEFINE_SERVERINFO;
```

Where wServerID is a lightweight identifier associated with this performance data context block, wServerType indicates the server type (e.g., mailbox server, public folder server, free busy server, global catalog server, etc. as indicated by one of the values enumerated in EXCHANGEPERF_SERVERTYPE below) and wOffsetServerDN is an offset to a string which contains a server domain name (DN).

```
typedef enum
{
    EXCHANGEPERF_SERVERTYPE_PRIVATESTORE = 1,
    EXCHANGEPERF_SERVERTYPE_PUBLICSTORE,
    EXCHANGEPERF_SERVERTYPE_DIRECTORY,
    EXCHANGEPERF_SERVERTYPE_DIRECTORYREFERRAL,
    EXCHANGEPERF_SERVERTYPE_MAX,
} EXCHANGEPERF_SERVERTYPE;
```

Another example of a server information performance data context block body data structure is:

```
typedef struct
{
    unsigned short    wServerID;
    unsigned short    wServerType;
    unsigned short    wOffsetServerDN;
    unsigned short    wOffsetServerName;
} EXCHANGEPERF_DEFINE_SERVERINFO;
```

Where the same named fields have the same meaning as in the previous example, and wOffsetServerName is an offset to a string that contains a server name.

An example of a client process performance data context block body data structure is:

```
typedef struct
{
    unsigned short    wProcessID;
    GUID              guidProcess;
    unsigned short    wOffsetProcessName;
} EXCHANGEPERF_DEFINE_PROCESSINFO;
```

Where wProcessID is a lightweight client process identifier associated with a heavyweight process GUID, and wOffsetProcessName is an offset to a string containing a name of the client process (e.g., "Microsoft Outlook 11").

An example of a performance data block body data structure utilized when sending performance data regarding a successful request/response cycle between the current client and current server of the current connection is:

```
typedef struct
{
    unsigned long     ulTimeSinceRequest;
    unsigned long     ulTimeToCompleteRequest;
    unsigned short    wRequestID;
} EXCHANGEPERF_STAT_DEFMDB_SUCCESS;
```

Where ulTimeSinceRequest is a number of milliseconds since a request was initiated, ulTimeToCompleteRequest is a number of milliseconds between sending a request and receiving a response, and wRequestID identifies the request, for example, as previously defined in a performance data context block containing a EXCHANGEPERF_REQUESTID data structure.

An example of a performance data block body data structure utilized when sending performance data regarding a successful request/response cycle during a communications session between the current client and a GC server is:

```
typedef struct
{
    unsigned short    wServerID;
    unsigned short    wRequestID;
    unsigned long     ulTimeSinceRequest;
    unsigned long     ulTimeToCompleteRequest;
} EXCHANGEPERF_STAT_DEFGC_SUCCESS;
```

Where the same named fields have the same meaning as in previous examples, and wServerID identifies the GC server, for example, as previously defined in a performance data context block containing a EXCHANGEPERF_DEFINE_SERVERINFO data structure.

An example of a performance data block body data structure utilized when sending performance data regarding a successful request/response cycle during a specified communications session between a specified client and a specified server is:

```
typedef struct
{
    unsigned short    wClientID;
    unsigned short    wServerID;
    unsigned short    wSessionID;
    unsigned short    wRequestID;
    unsigned long     ulTimeSinceRequest;
    unsigned long     ulTimeToCompleteRequest;
} EXCHANGEPERF_STAT_MDB_SUCCESS;
```

Where the same named fields have the same meaning as in previous examples, and wSessionID identifies a communications session, for example, as previously defined in a performance data context block containing a EXCHANGEPERF_DEFINE_SESSION data structure, and wClientID identifies a client, for example, as previously defined in a performance data context block containing a EXCHANGEPERF_DEFINE_CLIENTINFO data structure.

Another example of a performance data block body data structure utilized when sending performance data regarding a successful request/response cycle during a specified communications session between a specified client and a specified server is:

```
typedef struct
{
    unsigned short    wProcessID;
    unsigned short    wClientID;
    unsigned short    wServerID;
    unsigned short    wSessionID;
    unsigned short    wRequestID;
    unsigned long     ulTimeSinceRequest;
    unsigned long     ulTimeToCompleteRequest;
} EXCHANGEPERF_STAT_MDB_SUCCESS_V2;
```

Where the same named fields have the same meaning as in previous examples, and wProcessID identifies a client process, for example, as previously defined in a performance data context block containing a EXCHANGEPERF_DEFINE_PROCESSINFO data structure.

An example of a performance data block body data structure utilized when sending performance data regarding a successful request/response cycle during a communications session between a specified client and a specified GC server is:

```
typedef struct
{
    unsigned short    wClientID;
    unsigned short    wServerID;
    unsigned long     ulTimeSinceRequest;
    unsigned long     ulTimeToCompleteRequest;
    unsigned byte     bRequestID;
} EXCHANGEPERF_STAT_GC_SUCCESS;
```

Where the same named fields have the same meaning as in previous examples, wServerID identifies a GC server, for example, as previously defined in a performance data context block containing a EXCHANGEPERF_DEFINE_SERVERINFO data structure, and bRequestID is a GC server request type.

Another example of a performance data block body data structure utilized when sending performance data regarding a successful request/response cycle during a specified communications session between a specified client and a specified GC server is:

```
typedef struct
{
    unsigned short    wClientID;
    unsigned short    wServerID;
    unsigned short    wSessionID;
    unsigned long     ulTimeSinceRequest;
    unsigned long     ulTimeToCompleteRequest;
    unsigned byte     bRequestID;
} EXCHANGEPERF_STAT_GC_SUCCESS;
```

Where the same named fields have the same meaning as in previous examples, and wSessionID identifies a communications session between the client and GC server, for example, as previously defined in a performance data context block containing a EXCHANGEPERF_DEFINE_SESSION data structure.

Yet another example of a performance data block body data structure utilized when sending performance data regarding a successful request/response cycle during a specified communications session between a specified client and a specified GC server is:

```
typedef struct
{
    unsigned short    wProcessID;
    unsigned short    wClientID;
    unsigned short    wServerID;
    unsigned short    wSessionID;
    unsigned long     ulTimeSinceRequest;
    unsigned long     ulTimeToCompleteRequest;
    unsigned byte     bRequestID;
} EXCHANGEPERF_STAT_GC_SUCCESS_V2;
```

Where the same named fields have the same meaning as in previous examples.

An example of a performance data block body data structure utilized when sending performance data regarding a failed request/response cycle during a specified communications session between a specified client and a specified server is:

```
typedef struct
{
    unsigned short    wClientID;
    unsigned short    wServerID;
    unsigned short    wSessionID;
    unsigned short    wRequestID;
    unsigned long     ulTimeSinceRequest;
    unsigned long     ulTimeToFailRequest;
    unsigned long     ulResultCode;
    unsigned byte     bRequestID;
} EXCHANGEPERF_STAT_FAILURE;
```

Where the same named fields have the same meaning as in previous examples, ulTimeToFailRequest is a number of milliseconds between sending a request and the request failing, and ulResultCode is a request failure code (e.g., one of the RPC errors listed herein).

Another example of a performance data block body data structure utilized when sending performance data regarding a failed request/response cycle during a specified communications session between a specified client and a specified server is:

```
typedef struct
{
    unsigned short    wProcessID;
    unsigned short    wClientID;
    unsigned short    wServerID;
    unsigned short    wSessionID;
    unsigned short    wRequestID;
    unsigned long     ulTimeSinceRequest;
    unsigned long     ulTimeToFailRequest;
    unsigned long     ulResultCode;
    unsigned byte     bRequestID;
} EXCHANGEPERF_STAT_FAILURE;
```

Where the same named fields have the same meaning as in previous examples.

Other such data structures are possible, as will be appreciated by one of skill in the art.

Example Subset of RPC Errors

One possible subset of RPC errors to be reported are:

```
#define RPC_S_OK                          ERROR_SUCCESS
#define RPC_S_INVALID_ARG                 ERROR_INVALID_PARAMETER
#define RPC_S_OUT_OF_MEMORY               ERROR_OUTOFMEMORY
#define RPC_S_OUT_OF_THREADS              ERROR_MAX_THRDS_REACHED
#define RPC_S_INVALID_LEVEL               ERROR_INVALID_PARAMETER
#define RPC_S_BUFFER_TOO_SMALL            ERROR_INSUFFICIENT_BUFFER
#define RPC_S_INVALID_SECURITY_DESC       ERROR_INVALID_SECURITY_DESCR
#define RPC_S_ACCESS_DENIED               ERROR_ACCESS_DENIED
#define RPC_S_SERVER_OUT_OF_MEMORY        ERROR_NOT_ENOUGH_SERVER_MEMORY
#define RPC_S_ASYNC_CALL_PENDING          ERROR_IO_PENDING
#define RPC_S_UNKNOWN_PRINCIPAL           ERROR_NONE_MAPPED
#define RPC_S_TIMEOUT                     ERROR_TIMEOUT
#define RPC_X_NO_MEMORY                   RPC_S_OUT_OF_MEMORY
#define RPC_X_INVALID_BOUND               RPC_S_INVALID_BOUND
#define RPC_X_INVALID_TAG                 RPC_S_INVALID_TAG
#define RPC_X_ENUM_VALUE_TOO_LARGE        RPC_X_ENUM_VALUE_OUT_OF_RANGE
#define RPC_X_SS_CONTEXT_MISMATCH         ERROR_INVALID_HANDLE
#define RPC_X_INVALID_BUFFER              ERROR_INVALID_USER_BUFFER
#define RPC_X_PIPE_APP_MEMORY             ERROR_OUTOFMEMORY
#define RPC_X_INVALID_PIPE_OPERATION      RPC_X_WRONG_PIPE_ORDER
```

This is not the complete list of RPC errors. A complete list of RPC errors may depend on the exact RPC implementation being used. The subset of RPC errors to report on may depend on the type of information that is desired by the administrator.

It can thus be seen that a new and useful system and method for monitoring the performance of communications between clients and servers, as perceived by clients, has been provided. In view of the many possible embodiments to which the principles of this invention may be applied, it should be recognized that the embodiments described herein with respect to the drawing figure is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for reporting performance information as perceived by a client in a client server system, the method comprising:

detecting that a server is enabled to receive the performance information, wherein the performance information comprises at least one of: a request/response latency, a request/response error code, and a request/response error code frequency;

dispatching performance context information from the client to the server, wherein the performance context information comprises one or more of: a client computer system host name, a client user name, a client network adaptor name, a client network adaptor speed, and a client network protocol address;

dispatching a first request from the client to the server, wherein the first request specifies a first remote procedure call (RPC), and wherein the first RPC comprises at least one argument for executing a program on the server;

in response to the first request dispatched from the client to the server, receiving a first response from the server, wherein the first response comprises a result of the first RPC;

in response to the received first response, measuring a time delay from the client's dispatch of the first request to the client's receipt of the first response from the server, wherein the time delay is a number of milliseconds between sending the first request and receiving the first response, and wherein the time delay is a request/response latency of the first request;

storing the first request/response latency at the client until a second request specifying a second RPC is generated by the client;

appending the first request/response latency to a header of the second request from the client to the server; and dispatching, from the client to the server, the second request with the header, wherein the second request specifies the second RPC, and wherein the second RPC is different from the first RPC.

2. The method of claim 1, wherein the client is a messaging client, and wherein the server is a messaging server.

3. The method of claim 1, wherein the client is an email client, and wherein the server is an e-mail server.

4. The method of claim 1, wherein after detecting that the server is enabled to receive the performance information, the client receives performance information preferences from the server, and wherein the performance information preferences comprise at least one of: under what circumstances the client should send performance information, whether the client should send performance information related to communications with servers other than the server, and a maximum performance information age threshold over which the client should not send performance information to the server.

5. A software program embodied on a computer storage medium, wherein the software program is executable to perform the method of claim 1.

6. A computer-implemented method, comprising:

detecting that a server is enabled to receive performance data, wherein the performance data comprises at least one of: a request/response latency, a request/response error code, and a request/response error code frequency;

sending performance context information from a client to the server, wherein the performance context information comprises one or more of: a client computer system host name, a client user name, a client network adaptor name, a client network adaptor speed, and a client network protocol address;

sending a first request from the client to the server, wherein the first request specifies a first remote procedure call (RPC), and wherein the first RPC comprises at least one argument for executing a program on the server;

recording, at the client, a request initiation time for the first request;

receiving, at the client, a first response from the server comprising a result of the first RPC;

in response to the received first response, recording, at the client, a response received time for the first response;

calculating a first request/response latency comprising a difference between the response received time for the first response and the request initiation time for the first request, wherein the first request/response comprises a number of milliseconds between recording the request initiation time for the first request and recording the response received time for receiving the first response;

storing the first request/response latency at the client until a second request specifying a second RPC is generated by the client; and sending a second request from the client to the server, the second request comprising:

a header comprising the first request/response latency; and the second RPC, wherein the second RPC is different from the first RPC, and wherein the second RPC comprises at least one argument for executing a program on the server.

7. The method according to claim 6, wherein the performance data context information comprises at least one identifier of the performance data context information.

8. The method according to claim 6, wherein the performance data context information further comprises one or more of the following:

a server computer system host name;

a server network domain name; and a server type.

9. The method according to claim 6, wherein the performance data context information further comprises one or more of the following:

a globally unique identifier (GUID) associated with a client computer operating system process; and information regarding the client computer operating system process.

10. The method according to claim 9, wherein the performance data context information further comprises a globally unique identifier (GUID) associated with a client server communications session.

11. The method according to claim 6, wherein the second request further comprises an indication of at least one service desired of the server by the client.

12. The method of claim 6, wherein after detecting that the server is enabled to receive the performance data, the client receives performance data preference information from the server, and wherein the performance data preference information comprises at least one of: under what circumstances the client should send performance data, whether the client should send performance data related to communications with servers other than the server, and a maximum performance data age threshold over which the client should not send performance data to the server.

13. A computer storage medium having thereon computer executable instructions for performing the method according to claim 6.

14. A computer-implemented method, comprising:

detecting that a first server is enabled to receive performance data, wherein the performance data comprises at least one of: a request/response latency, a request/response error code, and a request/response error code frequency;

sending performance context information from a client to the first server, wherein the performance context information comprises one or more of: a client computer system host name, a client user name, a client network adaptor name, a client network adaptor speed, and a client network protocol address;

sending a first request from the client to the first server, wherein the first request specifies a first remote procedure call (RPC), and wherein the first RPC comprises at least one argument for executing a program on the first server;

recording, at the client, a request initiation time for the first request;

receiving, at the client, a first response from the first server comprising a result of the first RPC;

in response to the received first response, recording, at the client, a response received time for the first response;

calculating a request/response latency for the first request/response pair comprising a difference between the response received time for the first response and the request initiation time for the first request;

storing the request/response latency for the first request/response pair at the client until a second request specifying a second RPC is generated by the client; and sending a second request from the client to a second server, the second request comprising:
- a header comprising the request/response latency for the first request/response pair; and
- the second RPC, wherein the second RPC is different from the first RPC, and wherein the second RPC comprises at least one argument for executing a program on the second server.

15. The method according to claim 14, further comprising:
receiving the second request at the second server;
parsing the first request/response latency from the second request; and
updating, with the first request/response latency, at least one computer system memory resident performance data accumulator associated with the second server.

16. The method of claim 14, wherein after detecting that the first server is enabled to receive the performance data, the client receives performance data preference information from the first server, and wherein the performance data preference information comprises at least one of: under what circumstances the client should send performance data, whether the client should send performance data related to communications with servers other than the first server, and a maximum performance data age threshold over which the client should not send performance data to the first server.

17. A computer-implemented method, comprising:
detecting that a server is enabled to receive performance data, wherein the performance data comprises at least one of: a request/response latency, a request/response error code, and a request/response error code frequency;
sending a first request from a client to the server, wherein the first request specifies a first remote procedure call (RPC), and wherein the first RPC comprises at least one argument for executing a program on the server;
recording, at the client, a request initiation time for the first request;
receiving, at the client, a first response from the server comprising a result of the first RPC;
in response to the received first response, recording, at the client, a response received time for the first response;
calculating a request/response latency for the first request/response pair comprising a difference between the response received time for the first response and the request initiation time for the first request;
storing, at the client, performance data associated with the first request/response pair and a performance data storage time, the performance data comprising the request/response latency for the first request/response pair;
sending a second request from the client to the server, wherein the second request specifies a second RPC, and wherein the second RPC is different from the first RPC; and
when a difference between a request initiation time for the second request and the performance data storage time associated with the first request/response pair is less than a maximum performance data age threshold, incorporating the performance data associated with the first request/response pair into a header of the second request.

18. The method according to claim 17, further comprising receiving the maximum performance data age threshold from the server.

19. A computer system, comprising:
a processor, wherein the processor processes instructions for reporting performance data as perceived by a client in a client server network; and
a computer storage medium having stored thereon the instructions for reporting performance data, the stored instructions comprising a data structure, the data structure comprised of:
- a performance data remote procedure call (RPC) extension tag included in an RPC request for prefacing network performance data associated with a client, said performance data RPC extension tag comprising:
  - a performance data format version field;
  - at least one performance data format flag;
  - a performance data size field; and
  - an uncompressed performance data size field; and
- at least one performance data block relating to the performance data RPC extension tag, said at least one performance data block comprising:
  - a performance data block header, comprising:
  - a performance data block size field;
  - a performance data block format version field; and
  - a performance data block type field; and
  - a performance data block body comprising the network performance data associated with the client, wherein the performance data RPC extension tag and the at least one performance data block are incorporated in an RPC in each request/response cycle of the transmission of the RPC.

20. The computer system of claim 19, wherein the at least one performance data format flag is selected from a group consisting of compress performance data and obfuscate performance data.

21. The computer system of claim 19, wherein the performance data block type field indicates that the performance data block body contains client information performance data context pertaining to the client in the client server network, and wherein the performance data block body comprises:
a client-generated client information performance data context identifier;
a name of a computer system hosting the client;
a name of a user utilizing the client;
a network protocol address associated with the client;
a name of a network adapter associated with the client; and
a speed of the network adapter associated with the client.

22. The computer system of claim 19, wherein the performance data block body comprises: a variable byte array storage area; and at least one string type field comprising an offset to a location in the variable byte array storage area where the value of the string type field is stored.

23. The computer system of claim 19, wherein the performance data block type field indicates that the performance data block body contains server information performance data context pertaining to a server in the client server network, and wherein the performance data block body comprises:
a client-generated server information performance data context identifier;
a name of the server;
a network domain name of the server; and
a server type associated with the server.

24. The computer system of claim 19, wherein the performance data block type field indicates that the performance data block body contains client-generated performance data pertaining to a successful request/response pair between the client and a server in the client server network, and wherein the performance data block body comprises:
- a client-generated request identifier associated with the successful request/response pair;
- a round trip network latency corresponding to a difference between a time at which the client initiated the successful request/response pair and a time at which the client received the response; and
- a server processing time corresponding to a difference between a time at which the server received the request of the successful request/response pair and a time at which the server initiated the response.

25. The computer system of claim 24, wherein the performance data block size is 14 bytes.

26. The computer system of claim 19, wherein the performance data block type field indicates that the performance data block body contains client-generated performance data pertaining to a failed request/response pair between the client and a server in the client server network, and wherein the performance data block body comprises:
- a client-generated request identifier associated with the failed request/response pair;
- a time to fail corresponding to a difference between a time at which the client initiated the failed request/response pair and a time at which the client determined that the request had failed; and
- a failure code corresponding to a reason for the failure of the request.

27. The computer system of claim 19, wherein the performance data block type field indicates that the performance data block body contains server performance data preference information for a server in the client server network, and wherein the performance data block body comprises:
- an indication of whether to send client-generated performance data to the server pertaining to client communications with the server;
- an indication of whether to send client-generated performance data to the server pertaining to client communications with other servers in the client server network; and
- a performance data age threshold beyond which client-stored performance data should not be sent to the server.

* * * * *

UNITED STATES PATENT AND TRADEMARK OFFICE
CERTIFICATE OF CORRECTION

PATENT NO. : 7,650,403 B2  Page 1 of 1
APPLICATION NO. : 10/634937
DATED : January 19, 2010
INVENTOR(S) : Koetke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1374 days.

Signed and Sealed this

Twenty-eighth Day of December, 2010

David J. Kappos
*Director of the United States Patent and Trademark Office*